United States Patent
Ito et al.

(10) Patent No.: US 10,121,507 B2
(45) Date of Patent: Nov. 6, 2018

(54) WRITING METHOD OF DATA, READING METHOD OF DATA, AND OPTICAL DISC DRIVE

(71) Applicant: Panasonic Intellectual Property Management Co., Ltd., Osaka (JP)

(72) Inventors: Motoshi Ito, Osaka (JP); Yoshihisa Takahashi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 176 days.

(21) Appl. No.: 15/397,871

(22) Filed: Jan. 4, 2017

(65) Prior Publication Data

US 2017/0117012 A1 Apr. 27, 2017

Related U.S. Application Data

(63) Continuation of application No. PCT/JP2015/005544, filed on Nov. 5, 2015.

(30) Foreign Application Priority Data

Mar. 27, 2015 (JP) .................. 2015-065786

(51) Int. Cl.
*G11B 7/00* (2006.01)
*G11B 7/007* (2006.01)
(Continued)

(52) U.S. Cl.
CPC .......... *G11B 7/00718* (2013.01); *G06F 3/061* (2013.01); *G06F 3/064* (2013.01);
(Continued)

(58) Field of Classification Search
None
See application file for complete search history.

(56) References Cited

U.S. PATENT DOCUMENTS 5,508,995 A 4/1996 Moriya et al.
5,523,903 A * 6/1996 Hetzler ................ G11B 5/5526
360/48

(Continued)

FOREIGN PATENT DOCUMENTS

JP 7-29185 1/1995
JP 7-272420 10/1995
(Continued)

*Primary Examiner* — Peter Vincent Agustin
(74) *Attorney, Agent, or Firm* — Wenderoth, Lind & Ponack, L.L.P.

(57) ABSTRACT

On each of a plurality of recording layers of a write-once optical disc, two tracks constituted of adjacent land and groove are formed in a spiral shape. A writing method of data includes: a step of receiving data and a writing instruction of the data; and a step of recording management information, wherein the management information includes: virtual sequential recording range information that manages a last recorded address of the data as a virtual physical sector number; defect list that indicates a replacement correspondence relationship between the virtual physical sector number and an actually recorded physical sector number; and real next writable address information that indicates a real next writable address that is actually recordable subsequently to the physical sector number.

22 Claims, 23 Drawing Sheets

(51) Int. Cl.
    *G06F 3/06*         (2006.01)
    *G06F 12/10*       (2016.01)
    *G11B 7/0045*     (2006.01)
    *G11B 20/18*       (2006.01)
    *G11B 20/12*       (2006.01)

(52) U.S. Cl.
    CPC .......... *G06F 3/0656* (2013.01); *G06F 3/0677* (2013.01); *G06F 12/10* (2013.01); *G11B 7/0045* (2013.01); *G11B 20/1217* (2013.01); *G11B 20/1889* (2013.01); *G11B 2220/218* (2013.01); *G11B 2220/235* (2013.01)

(56) References Cited

U.S. PATENT DOCUMENTS

| | | | |
|---|---|---|---|
| 6,219,752 | B1 | 4/2001 | Sekido |
| 2002/0150023 | A1 | 10/2002 | Yamamoto et al. |
| 2002/0186637 | A1 | 12/2002 | Van Woudenberg et al. |
| 2003/0163756 | A1* | 8/2003 | George .............. G11B 20/1883 714/6.13 |
| 2005/0163032 | A1 | 7/2005 | Van Woudenberg et al. |
| 2005/0169135 | A1* | 8/2005 | Hwang .............. G11B 7/00736 369/47.21 |
| 2005/0207262 | A1 | 9/2005 | Terada et al. |
| 2006/0044979 | A1* | 3/2006 | Kuraoka ............ G11B 20/1217 369/53.17 |
| 2006/0077816 | A1* | 4/2006 | Park ....................... G11B 20/10 369/47.1 |
| 2008/0232210 | A1* | 9/2008 | Buban .................. G11B 27/034 369/47.13 |
| 2010/0177610 | A1 | 7/2010 | Matsuda |
| 2017/0117012 | A1* | 4/2017 | Ito .......................... G06F 3/061 |

FOREIGN PATENT DOCUMENTS

| | | |
|---|---|---|
| JP | 11-53235 | 2/1999 |
| JP | 2000-285469 | 10/2000 |
| JP | 3114689 | 12/2000 |
| JP | 2001-23170 | 1/2001 |
| JP | 2002-109761 | 4/2002 |
| JP | 2002-298360 | 10/2002 |
| JP | 2002-304730 | 10/2002 |
| JP | 2004-519810 | 7/2004 |
| JP | 2004-280865 | 10/2004 |
| JP | 2004-288293 | 10/2004 |
| JP | 2007-505431 | 3/2007 |
| JP | 2007-317299 | 12/2007 |
| JP | 2010-160863 | 7/2010 |
| WO | 2005/024791 | 3/2005 |

\* cited by examiner

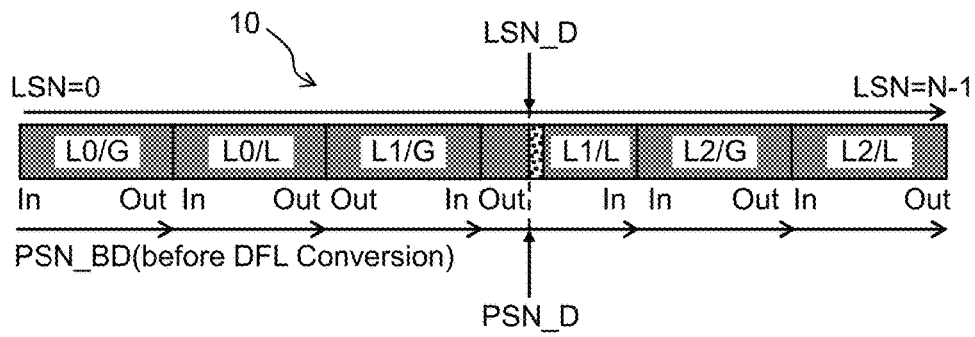
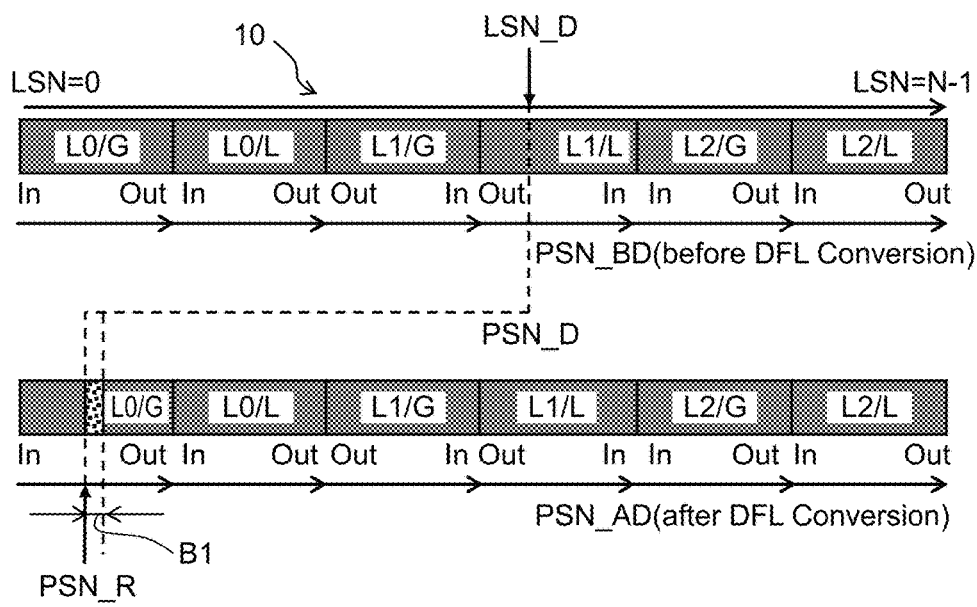

VSRRI

| SSN | VLRA |
|---|---|
| S1 | 0 |
| S2 | 0 |
| S3 | 0 |
| S4 | 0 |

DFL

| Defective | Replace | Blocks |
|---|---|---|

RNWA

| SSN in Layer | RNWA |
|---|---|
| S1 | S1 |

Physical already recorded area is managed by Pick NWA information (2)

| SSN | VLRA |
|---|---|
| S1 | LRA1 |
| S2 | 0 |
| S3 | 0 |
| S4 | 0 |

| Defective | Replace | Blocks |
|---|---|---|

| SSN in Layer | RNWA |
|---|---|
| S1 | S1+B1 |

(3)

| SSN | VLRA |
|---|---|
| S1 | LRA1 |
| S2 | 0 |
| S3 | LRA3 |
| S4 | 0 |

| Defective | Replace | Blocks |
|---|---|---|
| S2 | S1+B1 | B3 |
| S3+B3 | S1+B1+B3 | B3a |

| SSN in Layer | RNWA |
|---|---|
| S1 | S1+B1+ΣB3 |

※ΣB3=B3+B3a (4)

| SSN | VLRA |
|---|---|
| S1 | LRA1 |
| S2 | LRA2 |
| S3 | LRA3 |
| S4 | 0 |

| Defective | Replace | Blocks |
|---|---|---|
| S2 | S1+B1+ΣB3 | B2 |
| S3 | S1+B1 | B3 |
| S3+B3 | S1+B1+B3 | B3a |

| SSN in Layer | RNWA |
|---|---|
| S1 | S1+B1+ΣB3+B2 |

(5)

| SSN | VLRA |
|---|---|
| S1 | LRA1 |
| S2 | LRA2 |
| S3 | LRA3a |
| S4 | 0 |

| Defective | Replace | Blocks |
|---|---|---|
| S2 | S1+B1+ΣB3 | B2 |
| S3 | S1+B1 | B3 |
| S3+B3 | S1+B1+B3 | B3a |
| S3+ΣB3 | S1+B1+ΣB3+B2 | B30 |

| SSN in Layer | RNWA |
|---|---|
| S1 | S1+B1+ΣB3+B2+B30 |

(6)

| SSN | VLRA |
|---|---|
| S1 | LRA1 |
| S2 | LRA2a |
| S3 | LRA3a |
| S4 | 0 |

| Defective | Replace | Blocks |
|---|---|---|
| S2 | S1+B1+ΣB3+B2+B30 | B2 |
| S3 | S1+B1 | B3 |
| S3+B3 | S1+B1+B3 | B3a |
| S3+ΣB3 | S1+B1+ΣB3+B2 | B30 |

| SSN in Layer | RNWA |
|---|---|
| S1 | S1+B1+ΣB3+B2+B30+B2 |

WRITING METHOD OF DATA, READING METHOD OF DATA, AND OPTICAL DISC DRIVE

BACKGROUND

1. Technical Field

The present disclosure relates to a technology for writing data into an optical disc. More specifically, the present disclosure relates to a technology for writing data into an optical disc in which the data is recorded into respective land and groove tracks.

2. Description of the Related Art

Densification of an optical disc has advanced, and an optical disc with a much larger capacity is required.

In order to further increase the capacity of the optical disc, it is effective to write data into both land and groove tracks, to narrow a track pitch, and/or to stack a plurality of recording layers.

For example, Unexamined Japanese Patent Publication No. H07-29185 discloses an optical disc in which data is written into both land and groove tracks. Moreover, a track pitch of a Blu-ray (registered trademark, omitted below) disc is narrower than a track pitch of a DVD (registered trademark, omitted below), whereby an increase of a recording capacity, which is five times or more, is realized.

SUMMARY

The present disclosure provides an optical disc that realizes higher densification/larger capacity increase, and provides an optical disc device that writes data into such an optical disc, a method for writing the data into the optical disc, and the like.

A writing method of data in the present disclosure is a writing method of data into a write-once optical disc having a plurality of recording layers on at least one surface of the write-once optical disc, the writing method being performed by an optical disc drive including at least one optical pickup unit (OPU). In each of the plurality of recording layers, two tracks into which data is written, the two tracks being constituted of adjacent land and groove, are formed in a spiral shape, and a user data area where user data is recordable is set.

A writing method of data includes:

(x) a step of receiving data and a writing instruction of the data, from a host device;

(a) a step of recording management information,
the management information including:
virtual sequential recording range management information (VSRRI) that manages, as a virtual physical sector number (PSN_D), last recorded address of a data (VLRA) in each of a plurality of virtual sequential recording ranges (VSRR) ensured in advance;
defect list (DFL) that shows a correspondence relationship between the virtual physical sector number (PSN_D) and an actually recorded physical sector number (PSN_R); and
real next writable address information (RNWAI) indicating a real next writable address (RNWA) actually subjected to additional writing subsequently to the physical sector number (PSN_R);

(b) a step of converting a logical sector number (LSN) which indicates a writing position of the received data, into the virtual physical sector number (PSN_D);

(c) a step of writing the data into the real next writable address (RNWA) of each user data area of the plurality of recording layers in response to the writing instruction,
the step (c) including:
(c0) a step of designating, as an operation layer, a first recording layer among the plurality of recording layers;
(c1) a step of sequentially writing data along a first track of the user data area in the operation layer;
(c2) a step of sequentially writing data along a second track of the user data area after the recording to the first track of the user data area is completed; and
(c3) a step of newly designating, as an operation layer, a recording layer present at a position closer than the operation layer when further viewed from a laser-light incident side, and writing data by the step (c1) and the step (c2); and (d) a step of updating the defect list (DFL) and adding information of a correspondence relationship between the virtual physical sector number (PSN_D) of the designated data and the actually recorded physical sector number (PSN_R) that is the real next writable address (RNWA) at a point of time when the data is written.

The writing method of data in the present disclosure is effective for writing data into the optical disc that realizes the higher densification/larger capacity increase.

BRIEF DESCRIPTION OF THE DRAWINGS

FIG. 7 is a diagram showing respective groove and land tracks of three recording layers sorted in accordance with a writing order of data;

FIG. 8A is a diagram showing a principle of writing processing according to the first exemplary embodiment;

FIG. 8B is a table showing defect list DFL;

FIG. 18 is tables showing, with regard to each of states (1) to (6), transitions of the virtual sequential recording range information (VSRRI) managing virtual last recorded addresses (VLRA) that enables additional writing of data, defect list DFL, and real next writable addresses RNWA;

DETAILED DESCRIPTION

Figure 1A:
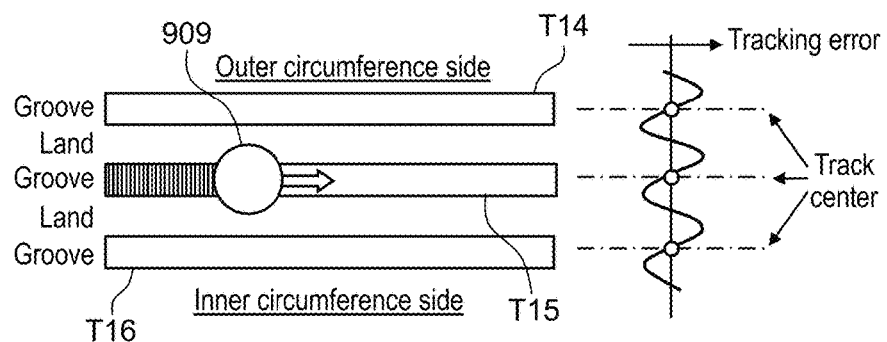
FIG. 1A is a diagram showing a relationship among three unrecorded parallel groove tracks T14, T15 and T16, laser spot 909, and a tracking error signal.

A description is made below in detail of exemplary embodiments while referring to the drawings as appropriate. However, a description detailed more than necessary is omitted in some cases. For example, a detailed description of items already well known and a duplicate description of substantially same configurations are sometimes omitted. This is to avoid unnecessary redundancy of the following description, and to facilitate the understanding of those skilled in the art.

Note that the inventors provide the accompanying drawings and the following description in order to allow those skilled in the art to fully understand the present disclosure, and do not intend to limit thereby the theme described in the scope of claims.

(Knowledge Obtained by the Inventors of the Present Application)

A description is made below of knowledge obtained by the inventors of the present application, and an optical disc and an optical disc device, which are based on the knowledge.

In a case of attempting to increase a recording capacity by stacking a plurality of recording layers, it is necessary to pay attention also to an operation of the optical disc device. More specifically, from which recording layer the optical disc device writes data is important. A reason for this is that transmittance of the recording layer concerned is changed depending on whether or not data is already written into a front layer.

In particular, in a case of writing the data into both land and groove tracks while narrowing a track pitch, the change of the transmittance has a large influence.

In order to provide an optical disc having a higher density and a larger capacity than heretofore, an optical disc in which a plurality of recording layers having a narrower track pitch are provided is required, and in addition, it is necessary to improve such a data writing method in consideration of physical characteristics of such an optical disc as described above.

Figure 1B:
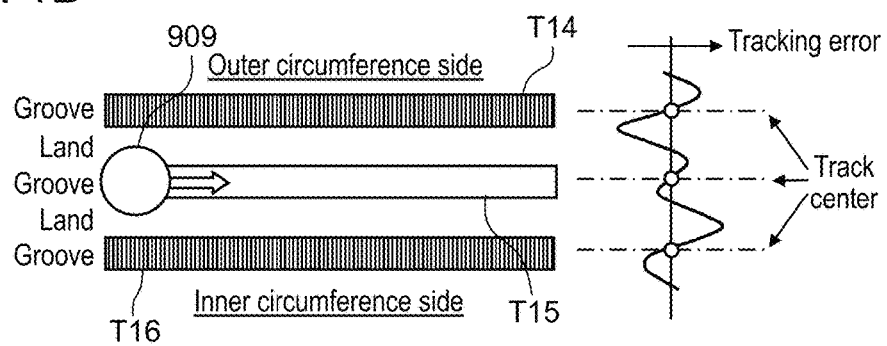
FIG. 1B is a diagram showing a relationship among three parallel groove tracks T14, T15 and T16, the tracks T14 and T16 being recorded and the track T15 being unrecorded, laser spot 909, and the tracking error signal.
Figure 1C:
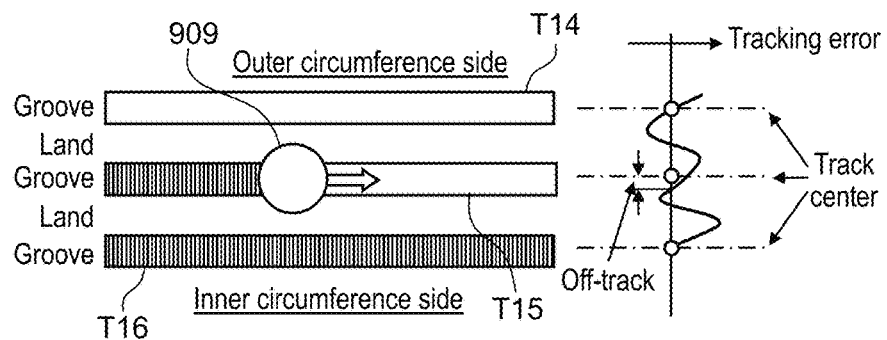
FIG. 1C is a diagram showing a relationship among three parallel groove tracks T14, T15 and T16, the track T16 being recorded and the tracks T14 and T15 being unrecorded, laser spot 909, and the tracking error signal.

FIGS. 1A, 1B and 1C show relationships among three parallel groove tracks T14, T15 and T16, laser spot 909, and a tracking error signal.

FIG. 1A shows an example of writing data into center track T15 when adjacent tracks T14 and T16 on both sides thereof are not subjected to recording yet. On a right side of FIG. 1A, a waveform chart of the tracking error signal is shown. Since adjacent tracks T14 and T16 are not subjected to the recording yet, a tracking error signal is regular. It is possible to allow laser spot 909 to follow a center of track T15 based on a zero cross point of the tracking error signal.

FIG. 1B shows an example of writing the data into center track T15 when both of adjacent tracks T14 and T16 on both sides thereof are already subjected to the recording. Since pits are recorded in adjacent tracks T14 and T16, influences at a same degree appear on the tracking error signal from adjacent tracks T14 and T16. Therefore, a distortion occurs in the tracking error signal. However, though amplitude of the tracking error signal decreases, it is possible to allow laser spot 909 to follow the center of track T15 based on the zero cross point of the tracking error signal.

FIG. 1C shows an example of writing the data into center track T15 at a time when the data is not written into outer circumference-side track T14 though the data is written into inner circumference-side track T16. When attention is paid to the tracking error signal at this time, the tracking error signal receives influences with different magnitudes from adjacent tracks T14 and T16, and accordingly, the zero cross point of the tracking error signal and the center of the track do not correspond to each other. Hence, when a position of laser spot 909 is controlled based on the zero cross point of the tracking error signal, laser spot 909 shifts from such a track center. More specifically, laser spot 909 shifts to an inner circumference side (below in the drawing).

In the examples of FIG. 1A, FIG. 1B and FIG. 1C, the data writing to the groove track is assumed; however, data writing to the land track is not assumed.

The inventors of the present application thought that, in order to enhance the recording density, it is necessary to adopt an optical disc in which the data is written into the groove track and the land track, the optical disc having a track pitch as narrow as possible, and then repeated study of the optical disc. As a result, the inventors of the present application derived a conclusion that, if parameters such as a wavelength of the laser light and the track pitch are selected as appropriate, then the laser spot can be adjusted by using the tracking error signal with regard to such writing examples corresponding to FIG. 1A and FIG. 1B. The writing example corresponding to FIG. 1A stands for that the data is written into the groove track, which is subjected to the writing, in a state where the data is not written into two land tracks adjacent to the groove track. Moreover, the writing example corresponding to FIG. 1B stands for that the data is written into the groove track, which is subjected to the writing, in a state where the data is already written into two land tracks adjacent to the groove track.

Meanwhile, with regard to such a writing example corresponding to FIG. 1C, the inventors of the present application confirmed that the distortion of the tracking error signal was still large. That is, in a state where the data is already written into only one of the land tracks adjacent to the groove track subjected to the writing, the tracking error signal was distorted to a large extent in an event of writing the data into the groove track. The tracking error signal became too asymmetric, whereby it becomes difficult to allow the laser spot to follow the center of the groove track, and it becomes difficult to write the data thereinto.

Hence, the inventors of the present application determined that the data just needed to be written into the densified optical disc under a condition of FIG. 1A or FIG. 1B.

By the above-mentioned study, the inventors of the present application completed recording control processing that permits recording limitations of a recoding medium (optical disc) to the maximum. The "recording limitations" mentioned herein are a recording limitation regarding the adjacent track and a recording limitation by a transmittance change of other recording layers.

A realization method of the recording control processing is, by operating a relationship between a logical address and a physical address by using a defect replacement list, (1) to record the data to sequential physical addresses in the order of address, even if logical addresses into which the data is written by a writing instruction of a host device is random, and (2) to provide the host device with a plurality of additional writing-enabled positions in a similar way to the conventional write-once recording medium. A description is made of details of the above in the following exemplary embodiments.

First Exemplary Embodiment

A description is made below of a first exemplary embodiment while referring to FIG. 1 to FIG. 19.

[1-1. Configuration]
[1-1-1. Configuration of Optical Disc]

In the present disclosure, the description is made while assuming an optical disc that satisfies the following optical and physical requirements. However, the following requirements are merely an example. It is also possible to adopt an optical disc that meets other different requirements.

Type of optical disc: Write-once optical disc
Capacity of recording layer: 50 gigabyte (GB)/layer
Optical parameters: Laser light wavelength $\lambda$=405 nanometers (nm), aperture ratio NA=0.85
Disc structure: Single-sided disc or double-sided disc (three recording layers on one-sided surface)
Land-and-groove format
Track pitch: 0.225 micrometers ($\mu$m)

Figure 2:
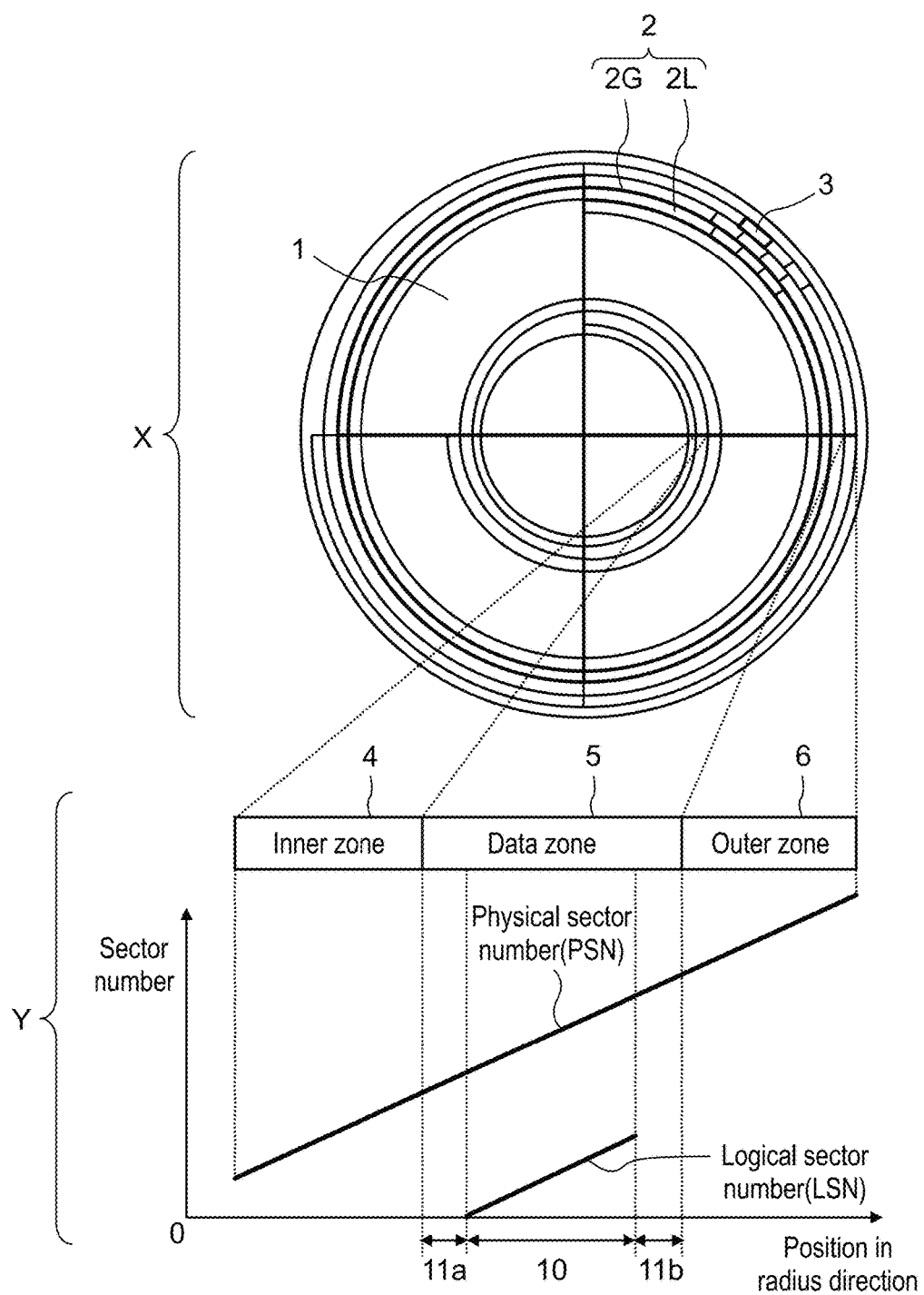
FIG. 2 is a diagram schematically showing a physical configuration and logical configuration of one recording layer of optical disc 1.

FIG. 2 is a diagram schematically showing a physical configuration and logical configuration of one recording layer of optical disc 1.

Portion X in FIG. 2 is an explanatory diagram showing an example of a physical configuration of optical disc 1. On disc-like optical disc 1, two tracks 2 (land track 2L and groove track 2G), into which data is written, the two tracks being constituted of a land and a groove, which are adjacent to each other, are formed in a spiral shape. Land track 2L is a track constituted of the land. Groove track 2G is a track constituted of the groove. On tracks 2, a large number of finely divided sectors 3 are formed.

Portion Y in FIG. 2 is an explanatory diagram showing an example of a logical configuration in a specific recording layer of optical disc 1. Here, groove track 2G of the recording layer is illustratively shown. A description is made of a relationship between land track 2L and groove track 2G while referring to FIG. 3.

As shown in FIG. 2, an area of optical disc 1 is broadly classified into inner zone 4, data zone 5 and outer zone 6.

Inner zone 4 and outer zone 6 function as margins for enabling an optical head (not shown) to follow the track even if the optical head overruns in an event where the optical head accesses an end portion of data zone 5. Inner zone 4 and outer zone 6 play roles as so-called overlap widths. Moreover, inner zone 4 includes a disc information area in which parameters necessary to access optical disc 1 are stored.

In order to identify each of sectors 3, each of sectors 3 is assigned with a physical sector number (PSN). Moreover, each of sectors 3 present in data zone 5 is also assigned with a logical sector number (LSN), which is one of a sequential series beginning from 0, in order that a host device (not shown) such as a host computer can recognize the sector.

Writing and reading of the data are performed for data zone 5. Data zone 5 includes user data area 10 for mainly recording user data. In front and behind user data area 10 of data zone 5, spare areas 11a and 11b to be described later are provided. Spare areas 11a and 11b are used to perform replacement recording of data, which should have been recorded in a defective sector, in a case where the defective sector is present in user data area 10.

Note that illustrated logical sector number LSN is an assignment example in a case where the replacement recording is not performed.

In the present disclosure, further, in order to actually register a sector, which is not the defective sector, by using a scheme of the replacement recording, spare areas 11a and 11b are used, and further, user data area 10 is used. Details will be described later.

Figure 3:
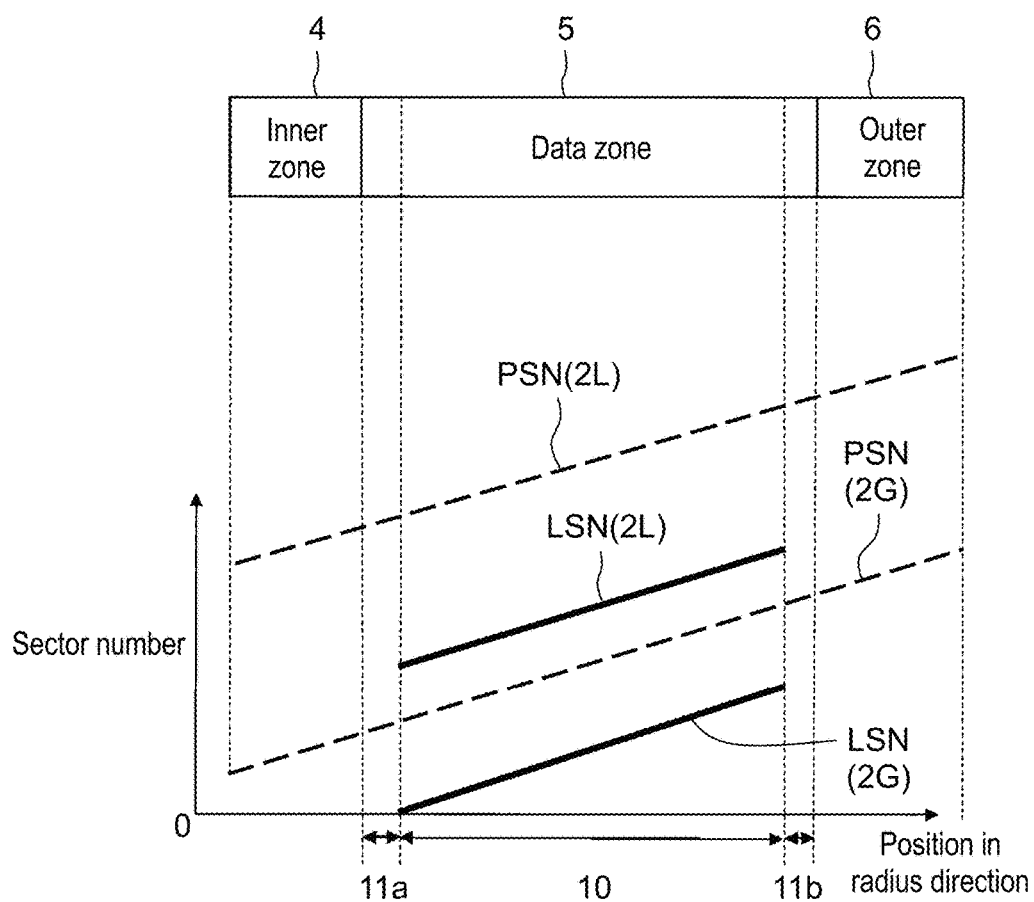
FIG. 3 is a diagram showing a relationship between physical sector numbers PSN and logical sector numbers LSN, which are given to land track 2L and groove track 2G.

FIG. 3 is a diagram showing a relationship between physical sector numbers PSN and logical sector numbers LSN, which are given to land track 2L and groove track 2G. Note that illustrated logical sector number LSN is the assignment example in the case where the replacement recording is not performed. In groove track 2G, as sequentially going from an inner circumference side to an outer circumference side, each of physical sector number PSN (2G) and logical sector number LSN (2G) is increased, for example, one by one. Also in land track 2L, as sequentially going from an inner circumference side to an outer circumference side, each of physical sector number PSN (2L) and logical sector number LSN (2L) is increased, for example, one by one.

Note that a first number of each of physical sector number PSN (2L) and logical sector number (2L) has a value obtained by adding 1 to a last number of physical sector number PSN (2G) and logical sector number LSN (2G).

Figure 4:
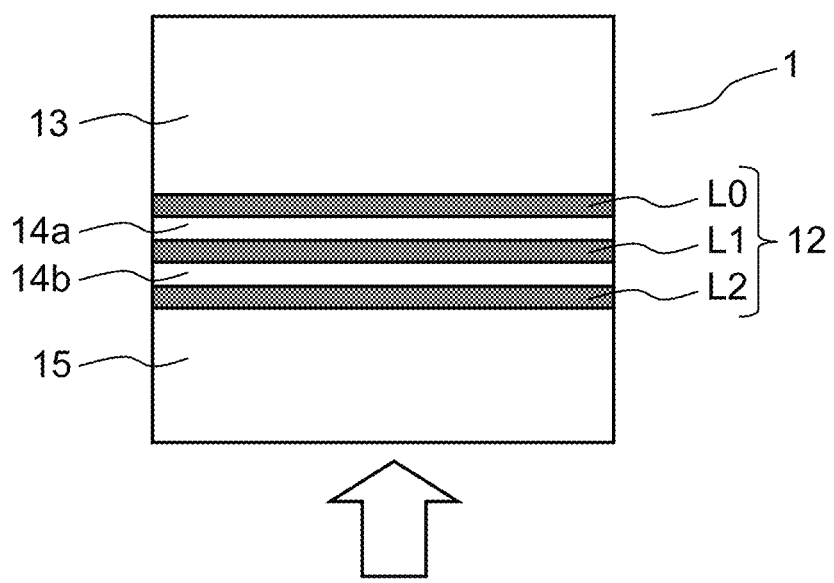
FIG. 4 is a diagram showing a cross section formed of a plane parallel to a rotation axis of optical disc 1.

FIG. 4 is a diagram showing a cross section formed of a plane parallel to a rotation axis of optical disc 1. Optical disc 1 includes recording layer 12 constituted of three recording layers L0 to L2.

In optical disc 1, there are stacked substrate 13, recording layer L0, transparent space layer 14a, recording layer L1, transparent space layer 14b, recording layer L2 and cover layer 15 in this order. As shown by an arrow, the laser light becomes incident in a direction from a cover layer 15 side to substrate 13 (that is, a direction going above from a bottom of FIG. 4). That is, when viewed from cover layer 15 on the side onto which the laser light becomes incident, recording layer L0 is provided at a deepest position, recording layer L1 is disposed at a shallower position, and recording layer L2 is disposed at a still shallower position.

A thickness of substrate 13 is approximately 1.1 mm, and a thickness of cover layer 15 is at least 53 µm or more.

In this exemplary embodiment, as an example, the thickness of cover layer 15 is set to 57 µm, a thickness of space layer 14a is set to 25 µm, and a thickness of space layer 14b is set to 18 µm. It is preferable that the thicknesses of space layers 14a and 14b, that is, intervals between respective recording layers L0 to L2 be designed so that interference (inter-layer interference) between diffracted light from the respective recording layers can be reduced. Since light must be allowed to transmit through recording layers L1 and L0, transmittance of recording layers L2 and L1 is designed to be a relatively high value (for example, 55% to 65%).

Figure 5:
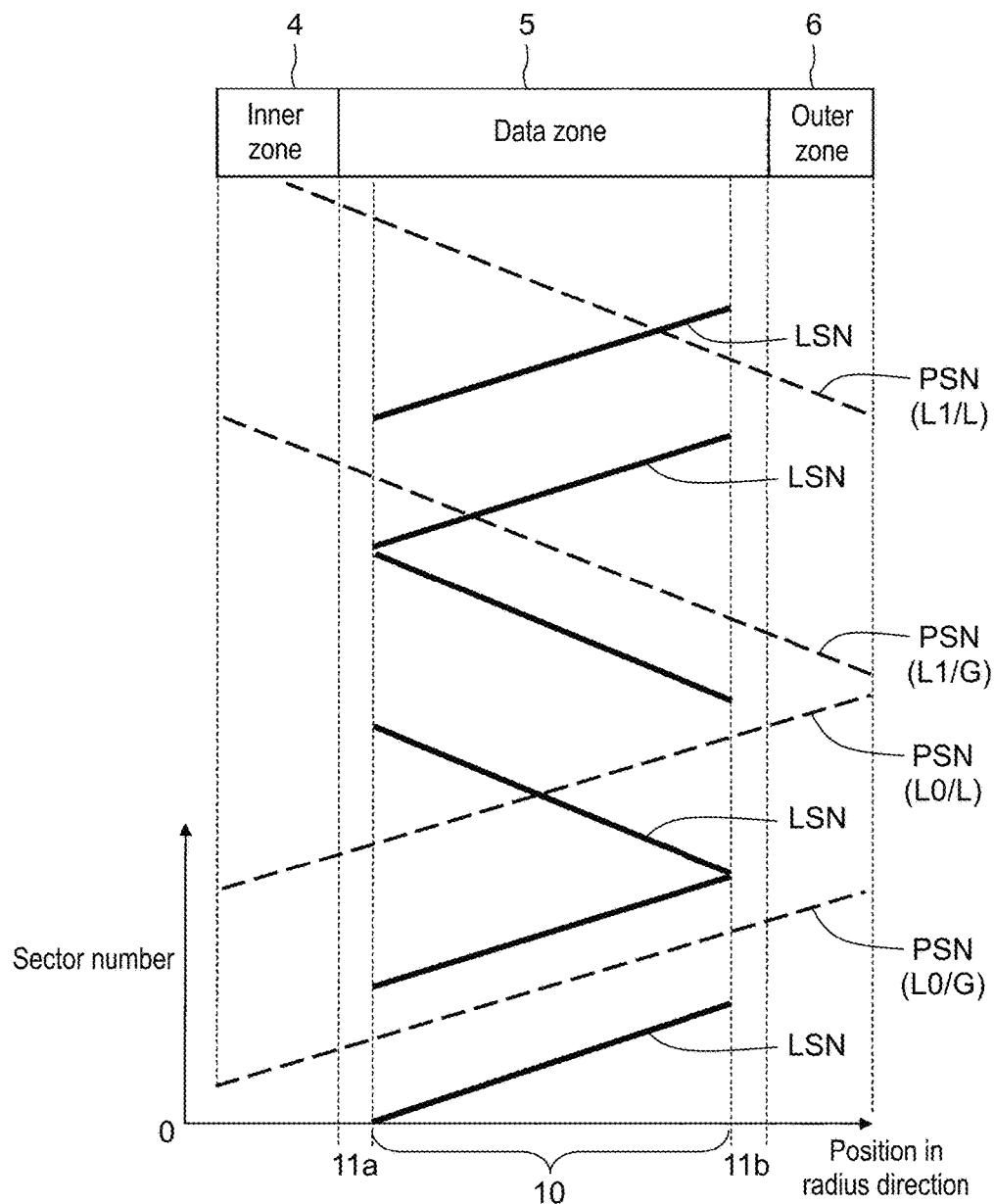
FIG. 5 is a diagram showing a relationship between physical sector numbers PSN of three recording layers L0 to L2 and logical sector numbers LSN.

FIG. 5 is a diagram showing a relationship between physical sector numbers PSN of three recording layers L0 to L2 and logical sector numbers LSN. Illustrated logical sector numbers LSN are the assignment example in the case where the replacement recording is not performed. Broken lines indicate physical sector numbers PSN, and solid lines indicate logical sector numbers LSN. In a similar way to FIG. 3, logical sector numbers LSN are given to user data area 10, and replacement areas 11a and 11b of the respective recording layers are excluded. Note that, for convenience of the description, a description corresponding to physical sector number PSN of recording layer L2 is omitted.

In a conventional optical disc known heretofore, physical sector numbers PSN and logical sector numbers LSN have corresponded to each other in a one-to-one relationship in principle. Exceptionally, the optical disc device sometimes performs processing for writing data to a position different from a position of such a scheduled physical sector number. This is so-called replacement recording processing. In a case where a defect is present at a position of the physical sector number into which the data is written, and the data cannot be written, then the optical disc device writes the data into a position in a replacement recording area. In this event, the optical disc device generates a defect list (DFL) that is replacement management information in which the physical sector number scheduled to be subjected to the writing and a physical sector number subjected to the replacement recording are associated with each other, and records the defect list in the optical disc. At this time, a logical sector number scheduled to be associated with the physical sector number scheduled to be subjected to the writing is associated with such a physical sector in which the replacement recording is performed. In such a way, while avoiding the defect, the logical sector number can be designated, necessary data can be written, and the written data can be read.

In optical disc 1, as mentioned above, the data is written into both of the land and the groove. Then, in the optical disc as described above, it is necessary that the data writing be performed in a state where the data is already written into both of two tracks adjacent to the track for which the data writing is performed, or alternatively, in a state where the data is not written into any of the two adjacent tracks.

In order to realize the data writing in this state, the inventors of the present application realized a recording method of first writing data into the groove track of recording layer L0, and thereafter, writing data into the land track of the same recording layer. The inventors of the present application created a method of applying the defect list DFL for use in the replacement recording processing.

[1-1-2. Outline of Data Writing Method]

Figure 6:
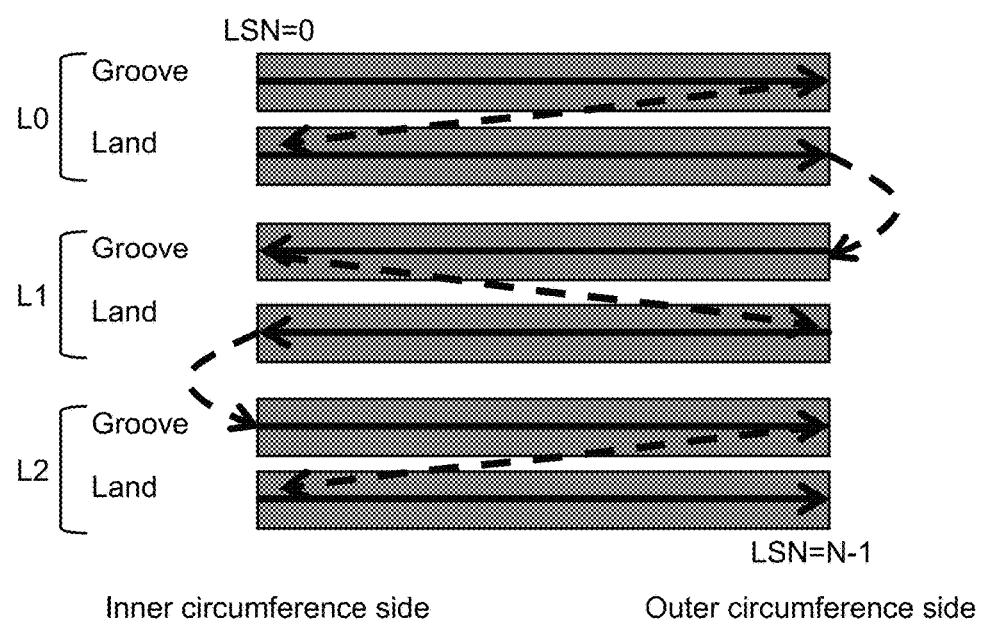
FIG. 6 is a diagram showing a moving path of laser light in an event where an optical disc device according to a first exemplary embodiment writes data into respective groove and land tracks of recording layers L0 to L2 of optical disc 1.

FIG. 6 is a diagram showing a moving path of the laser light in an event where the optical disc device according to this exemplary embodiment writes data into the respective groove and land tracks of recording layers L0 to L2 of optical disc 1. Note that details of the optical disc device will be described later.

When viewed from cover layer 15 on the side onto which the laser light becomes incident, the optical disc device first writes data into recording layer L0 provided at the deep position, and thereafter, sequentially writes data into recording layers L1 and L2. In accordance with this recording method, the laser light always penetrates the recording layer for which the writing is not performed yet. Hence, the data writing processing is not affected by variations of the transmittance, which correspond to whether the data is recorded.

The optical disc device radiates the laser light by using an optical pickup unit, and writes the data from the inner circumference side of the groove track of recording layer L0 toward the outer circumference side thereof. When the writing into the groove track is finished, the optical pickup unit moves to the inner circumference one more time, and writes the data into the land track from the inner circumference side of recording layer L0 toward the outer circumference side thereof.

When the writing of the data into the land track of recording layer L0, the optical pickup unit moves a focal point of the laser light to recording layer L1, and writes the data into the groove track from an outer circumference side of recording layer L1 toward an inner circumference side thereof. When the writing into the groove track is finished, the optical pickup unit moves to the outer circumference one more time, and writes the data into the land track from the outer circumference side of recording layer L1 toward the inner circumference side thereof.

Thereafter, the optical pickup unit records the data into recording layer L2. Operations in this case are the same as those of the writing of the data into recording layer L0, and accordingly, a description of the operations is omitted.

In accordance with the above-mentioned writing order, each writing processing for the groove track and the land track can be performed stably. That is, at the time of the writing into the groove track, the writing into the adjacent land track is not performed, and accordingly, the writing processing corresponding to FIG. 1A is performed. That is, the tracking error signal is stabilized at this time. At the time of the writing into the land track, the writing into the groove tracks adjacent to the land track is already performed, and accordingly, the writing processing corresponding to FIG. 1B is performed. That is, the tracking error signal is stabilized also at this time. These can be said to be such a data writing method effective for optical disc 1 in which the land track and the groove track are alternately formed in a spiral shape.

However, as mentioned above, in accordance with the conventional method in which the logical sector numbers and the physical sector numbers are associated with each other in the one-to-one relationship and are used for the writing and the reading, the above-mentioned writing method cannot be realized. There is required a new method for realizing the writing into the groove track and the land track in the above-mentioned order without writing the data into the physical sector numbers corresponding to the logical sector numbers given from the host device.

A description is made below of such a new method for associating the physical sector numbers PSN and the logical sector numbers LSN with each other, the new method being created by the inventors of the present application. The description of the new method is made below with reference to FIG. 7 to clarify the new method concerned.

FIG. 7 is a diagram showing the respective groove and land tracks of three recording layers sorted in accordance with such a writing order of the data. In FIG. 7, for example, "L0/G" indicates the groove track of recording layer L0, and "L2/L" indicates the land track of recording layer L2. Six arrows in a line below the groove tracks and the land tracks indicate a data writing direction. Note that, as shown in FIG. 7, conventionally, when specific logical sector number LSN_D is designated from the host device, physical sector number PSN_D into which the data is written has also be uniquely specified. As long as physical sector number PSN_D is not defective, this relationship is not changed.

FIG. 8A is a diagram showing a principle of the writing processing according to this exemplary embodiment. Moreover, FIG. 8B is a table showing defect list DFL.

Unlike the example of FIG. 7, in this exemplary embodiment, when the optical disc device receives a designation of specific logical sector number LSN_D from the host device, then "PSN_D" that is a physical sector number of a position subjected to the writing in a case where defect replacement is not performed is converted into "PSN_R" that is a physical sector number of a position into which the data should be actually written, and physical sector number "PSN_R" is written. Physical sector number PSN_R after the conversion is a position immediately after such a position until which the data has been written in the order shown in FIG. 8A. That is, in accordance with the writing processing of this exemplary embodiment, the optical disc sequentially makes the additional writing for the data into optical disc 1 in the order shown in FIG. 6.

At a time of performing the conversion of the physical sector number, which is as described above, the optical disc device generates defect list DFL in which physical sector number "PSN_D" indicating the position into which the data should be written heretofore and actual physical sector number "PSN_R" are associated with each other. FIG. 8B shows defect list DFL in which physical sector number PSN_D treated as a defective and physical sector number PSN_R treated as a replace are associated with each other. Note that "B1" that is a number of blocks, which indicates a size of blocks used for the recording from physical sector number PSN_R, is also registered in combination. The "block" mentioned herein is also called a cluster, is a unit at which the data writing is physically performed for optical disc 1, and is equal to a unit (ECC block) of an error correction symbol for performing error correction. For example, in a Blu-ray disc, a user data size of one sector is 2 kilobytes, and one block (one cluster) has 32 sectors and 64 kilobytes as a user data size.

Defect list DFL is data, which has been conventionally used for the replacement processing when the defective sector is present. In the optical disc such as DVD-R and Blu-ray discs, defect list DFL and the processing using defect list DFL are standardized. The inventors of the present application use defect list DFL, which is present in optical disc 1, for a purpose different from the conventional purpose, and has realized the processing for writing the data into optical disc 1 sequentially in the order shown in FIG. 6.

In this exemplary embodiment, physical sector number PSN_D before being converted by the defect list is sometimes referred to as a "PSN_BD" (BD: Before DFL Conversion) address, and physical sector number PSN_R after being converted thereby is sometimes referred to as a "PSN_AD" (AD: After DFL Conversion) address (refer to FIG. 7 and FIG. 8A).

[1-1-3. Data Structure of Optical Disc]

Figure 9:
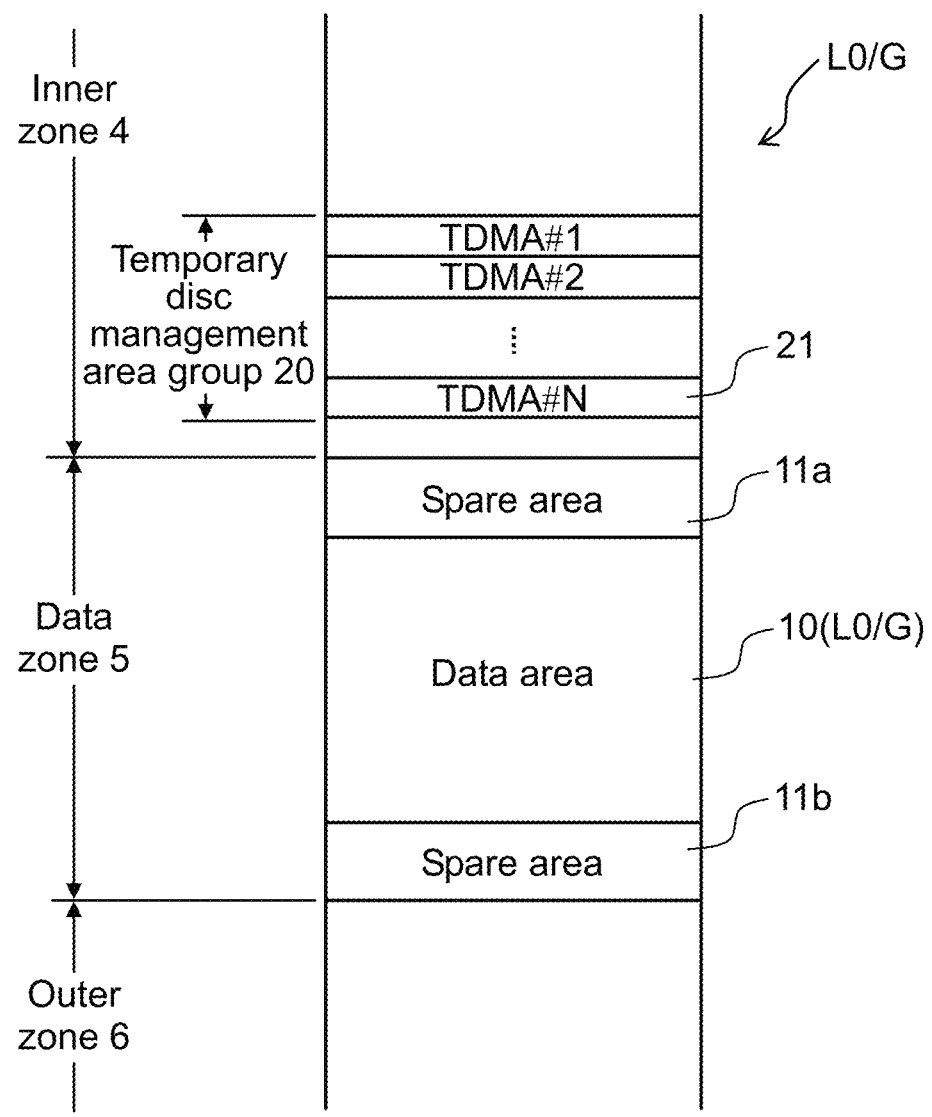
FIG. 9 is a diagram showing a detailed data structure of recording layer L0/G of optical disc 1.

FIG. 9 is a diagram showing a detailed data structure of recording layer L0/G of optical disc 1. As already described, in optical disc 1, there are provided inner zone 4, data zone 5 and outer zone 6. Here, attention is paid to inner zone 4. A description of data zone 5 and outer zone 6 is omitted.

Inner zone 4 includes temporary disc management area (TDMA) group 20. As temporary disc management area group 20 shown in FIG. 9, a plurality of temporary disc management areas (TDMA) #1 . . . and #N are ensured. A size of each of temporary disc management areas (TDMA) is one block (64 kilobytes) or multiples of one block.

Every time when the data is written, the optical disc device ensures a new temporary disc management area (TDMA), and records new information, which is related to the processing according to this exemplary embodiment, in the temporary disc management area. The word "temporary" stands for such a meaning.

Now, attention is paid to N-th temporary disc management area (TDMA) 21 that is latest. In this temporary disc management area 21, there is stored information on which all pieces of the writing processing until then are reflected. This information is referred to as a temporal disc management structure (TDMS).

Figure 10:
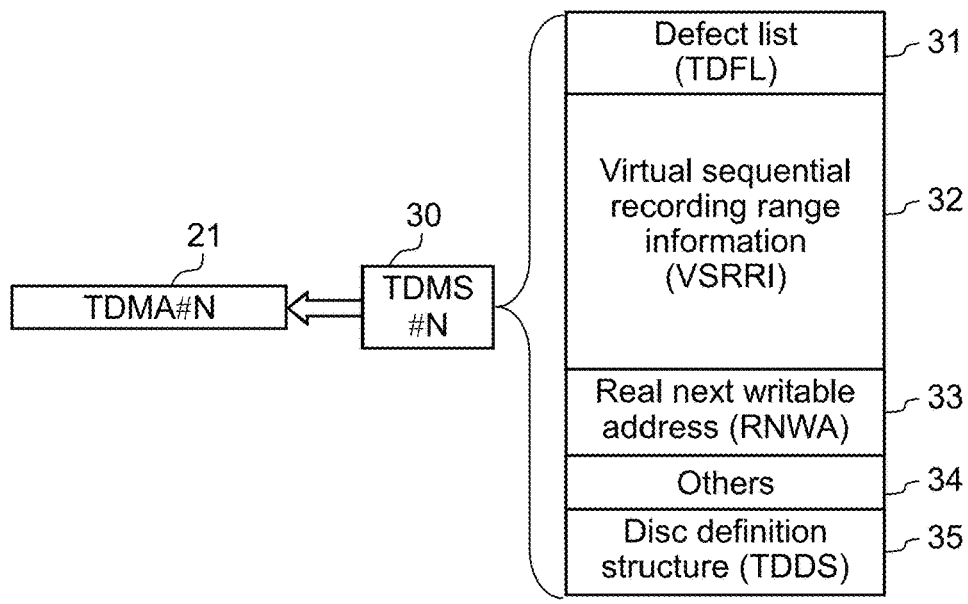
FIG. 10 is a diagram showing a data structure of temporal disc management structure (TDMS) 30 written into latest temporary disc management area (TDMA) 21.

FIG. 10 is a diagram showing a data structure of temporal disc management structure (TDMS) 30 written into latest temporary disc management area (TDMA) 21. Temporal disc management structure (TDMS) 30 includes: defect list (TDFL) 31; virtual sequential recording range information (VSRRI) 32; real next writable address (RNWA) 33; other reservation information (reserved) 34; and temporary disc definition structure (TDDS) 35. Each of the above elements will be described later in detail. Note that, since defect list 31 and disc definition structure 35 are updated every time when the data is written, defect list 31 and disc definition structure 35 are described by using "TDFL" and "TDDS" in FIG. 10 in order to clarify that each thereof is "temporal".

Figure 11:
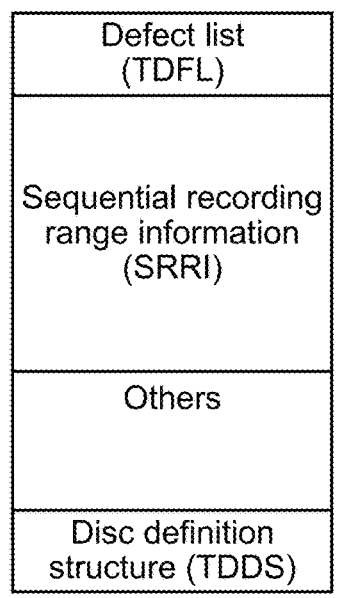
FIG. 11 is a diagram showing a data structure of each temporary disc management area (TDMA) adopted in a general Blu-ray disc.

FIG. 11 is a diagram showing a data structure of each temporary disc management area (TDMA) adopted in a general Blu-ray disc. As apparent from comparison between FIG. 10 and FIG. 11, temporal disc management structure (TDMS) 30 according to this exemplary embodiment, which is shown in FIG. 10, newly includes real next writable address (RNWA) 33. Then, as mentioned above, even under a circumstance where a defect is not present, the PSN_BD address is converted into the PSN_AD address by using a defect list. The temporal disc management structure (TDMS) having the real next writable address (RNWA) is written into each temporary disc management area (TDMA), and conversion processing that will be described later in detail is performed, whereby it is ensured that the writing of the data into the respective recording layers is performed in the order shown in FIG. 6.

Figure 12:
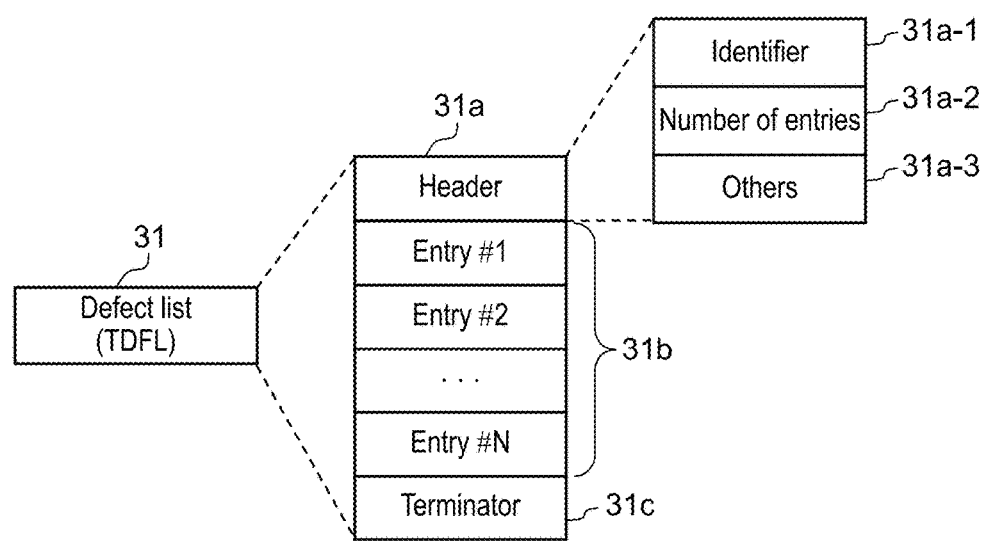
FIG. 12 is a diagram showing a data structure of defect list (TDFL) 31.

FIG. 12 is a diagram showing a data structure of defect list (TDFL) 31. Defect list (TDFL) 31 includes header 31a, entry list 31b and terminator 31c. In this exemplary embodiment, it is assumed that N pieces of entries (#1 to #N) are written in entry list 31b.

Header 31a includes identifier information 31a-1, number-of-entries information 31a-2; and other information 31a-3. In identifier information 31a-1, information (ID) indicating that the data is defect list (TDFL) 31 is described. Number-of-entries information 31a-2 indicates the number of entries described in entry list 31b. In this example, a value indicating that the number of entries is N is described. In terminator 31c, information indicating that the data is at the bottom of defect list (TDFL) 31 is described.

In entry list 31b, for example, N pieces of 64-bit entries are stored. For example, each entry is defect list DFL of FIG. 8B.

Figure 13:
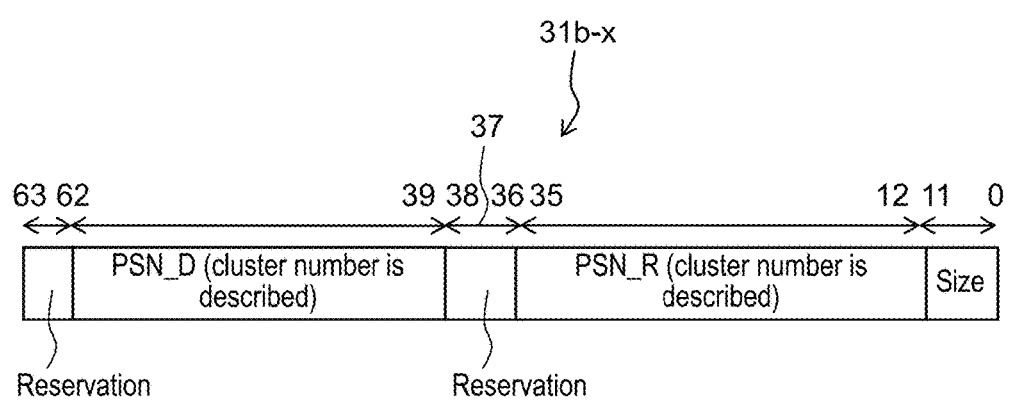
FIG. 13 is a diagram showing a data structure of one entry list 31*b-x*.

FIG. 13 is a diagram showing a data structure of one entry list 31b-x. Each of entries #1 to #N has a data structure shown in FIG. 13. As an example, in this exemplary embodiment, among all of 64 bits, physical sector number PSN_D represented by a cluster number is stored in bit numbers 39 to 62, and physical sector number PSN_R represented by a cluster number is stored in bit numbers 12 to 35. Then, in bit numbers 0 to 11, a size of the sequential areas where the replacement recording is performed is described. In this exemplary embodiment, the "size" is expressed as the number of blocks (clusters).

Conventionally, in the Blue-ray disc, the physical sector number has been described in the defect list. One cluster of the Blu-ray disc is constituted of 32 sectors, and accordingly, a cluster number (24 bits) and a sector number (5 bits) have been necessary in order to describe an absolute sector number. However, a unit of processing, for which the writing is performed, is the cluster, and accordingly, even if the sector number itself is described, only the sector concerned cannot be replaced. It is sufficient that the cluster number can be specified. In actual, in the conventional Blu-ray disc, low-order 5 bits before and after the replacement recording are always 0, and accordingly, have been redundant information.

In the present disclosure, a large number of sequential areas are replaced to record the data into the sequential physical addresses in order of addresses. Only the cluster numbers are described, whereby a necessary bit number can be reduced, and bits which have obtained a margin can be used to describe the information of the size of the sequential areas. Specifically, in this exemplary embodiment, the physical sector number expressed by the cluster number (24 bits) and the sector number (5 bits) is expressed by only the cluster number. In such a way, such a remainder of 5 bits is generated in each representation before and after the replacement. Moreover, 2 bits are supplied from other arbitrary usable areas. In such a way, by one entry, the size of the sequential areas subjected to the replacement recording can be expressed within a range of 12 bits.

Next, a description is made of virtual sequential recording range information (VSRRI) 32.

Virtual sequential recording range information (VSRRI) 32 is management information of a virtual sequential recording range (VSRR). The virtual sequential recording range (VSRR) stands for ranges, which are ensured or reserved in user data area 10 (FIG. 5, FIG. 9 and the like) before the writing of the data, and can be subjected to sequential writing while individually having independent additional writing positions. Virtual sequential recording range information (VSRRI) 32 holds information indicating a position of the ensured area, and until which position in the range the data is written.

Figure 14:
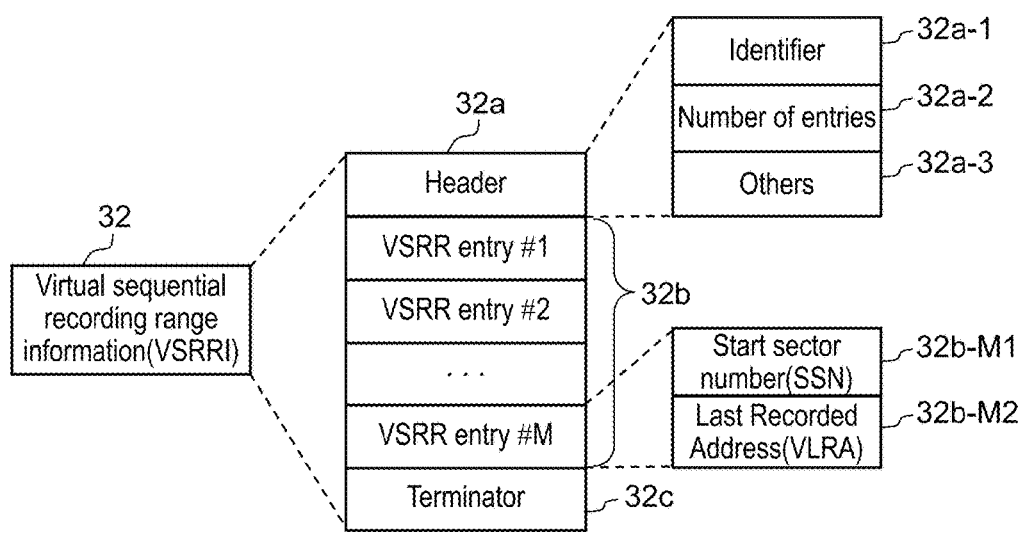
FIG. 14 is a diagram showing a data structure of virtual sequential recording range information (VSRRI) 32.

FIG. 14 is a diagram showing a data structure of virtual sequential recording range information (VSRRI) 32.

Virtual sequential recording range information (VSRRI) 32 includes header 32a, VSRR entry list 32b, and terminator 32c. In this exemplary embodiment, it is assumed that M pieces of entries (#1 to #M) are written in VSRR entry list 31b. In this exemplary embodiment, for example, M is 4.

Header 32a includes identifier information 32a-1, number-of-entries information 32a-2; and other information 32a-3. In identifier information 32a-1, information (ID) indicating that the data is virtual sequential recording range information (VSRRI) 32 is described. Number-of-entries information 32a-2 indicates the number of entries described in entry list 32b. In this example, a value indicating that the number of entries is M is described. In terminator 32c, information indicating that the data is at the bottom of virtual sequential recording range information (VSRRI) 32 is described.

VSRR entry list 32b is an aggregate of entries added in such a manner that the virtual sequential recording range (VSRR) is ensured.

In each of the entries, there are described: physical sector number (start PSN) 32b-M1 that specifies a start sector number of the virtual sequential recording range (VSRR); and a virtual last recorded address (VLRA) 32b-M2 that is recording end PSN of the virtual sequential recording range (VSRR). The "last recorded address" indicates a last position subjected to the data writing in the virtual sequential recording range (VSRR). These start sector number and last recorded address are indicated by using the physical sector numbers before the conversion using defect list (TDFL) 31. As described above, the positions of the virtual sequential recording range (VSRR) are different from physical positions recorded actually, and accordingly, the virtual sequential recording range (VSRR) is added with a prefix "virtual".

[1-2. Configuration of Optical Disc Device]

Next, a description is made of a configuration of optical disc device 100.

Figure 15:
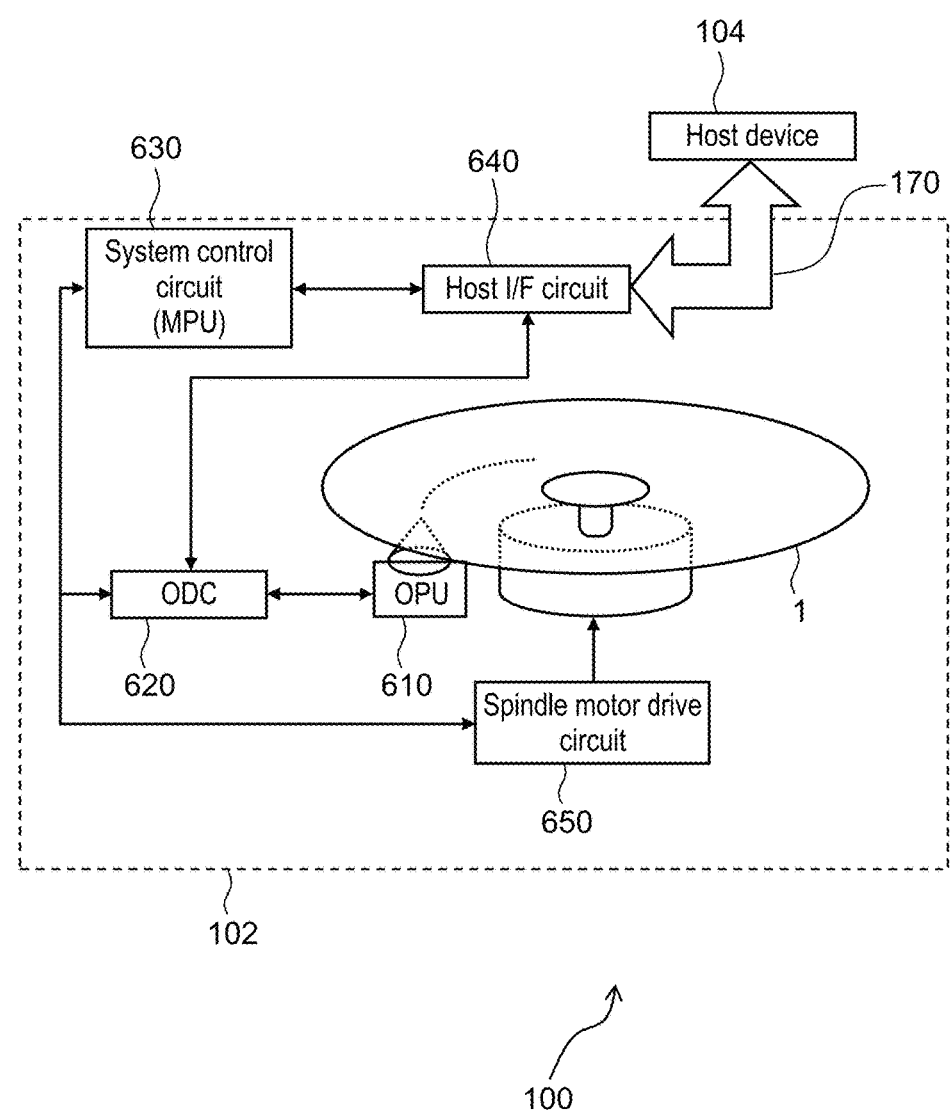
FIG. 15 is a diagram showing a schematic configuration of optical disc device 100.

FIG. 15 is a diagram showing a schematic configuration of optical disc device 100. Optical disc device 100 includes optical disc drive 102 and host device 104, which are connected to each other by I/O bus 170. For example, host device 104 is a host computer or a main CPU of optical disc device 100.

Optical disc drive 102 includes: optical pickup unit (OPU) 610; optical disc controller (ODC) 620; system control circuit (MPU: Micro Processing Unit) 630; host interface circuit (host I/F circuit) 640; and spindle motor drive circuit 650.

Optical pickup unit 610 radiates laser light, receives reflected light from optical disc 1, and outputs a result of receiving the reflected light. Based on a signal output from optical pickup unit 610, for example, optical disc controller 620 performs tracking servo control and focus servo control, and controls optical pickup unit 610. By this control, a spot (laser spot) of the laser light is continuously located on a desired track of a desired recording layer, and as a result, data is read from the track, or data is written into the track.

ODC 620 is a control circuit for controlling the writing of the data into optical disc 1 and/or the reading of the data from optical disc 1, and for example, is implementable as a semiconductor integrated circuit.

MPU 630 controls communication between optical disc drive 102 and host device 104, and in addition, also controls operations of optical disc controller 620 and spindle motor drive circuit 650. MPU 630 is a so-called microcomputer, performs processing shown in a flowchart (FIG. 19) to be described later, and thereby realizes the processing according to this exemplary embodiment. Note that, in the following description, in an event of the writing of the data to a specific recording layer and the reading thereof from the specific recording layer, MPU 630 designates the recording layer, which is to be subjected to the reading or the writing, as an operation layer. In such a way, MPU 630 can perform such processing that is directed to the recording layer. In a case where a writing position is changed to a different recording layer (for example, a recording layer at a closer position), MPU 630 designates the recording layer concerned as a new operation layer.

Host interface circuit (host I/F circuit) 640 is a circuit that transfers a signal with host device 104, and for example, is a bus controller. An example of a signal received from the host device is a writing instruction and data to be written thereby, or is a reading instruction of data. An example of a signal transmitted to the host device is read data (reproduced data). An example of a signal received from the host device is written data (recorded data). The reproduced data and the recorded data are transferred at a high speed by a DMA (direct memory access) through host I/F circuit 640 and ODC 620.

Spindle motor drive circuit 650 controls rotation of a spindle motor. For example, spindle motor drive circuit 650 controls a start of the rotation, rotation speed, and an end of the rotation, of the spindle motor.

By these operations, the writing and reading of the data when optical disc 1 is loaded into optical disc drive 102 can be realized. Details of the writing processing and the reading processing will be described later in detail.

[1-3. Operation of Optical Disc Device]

Figure 16:
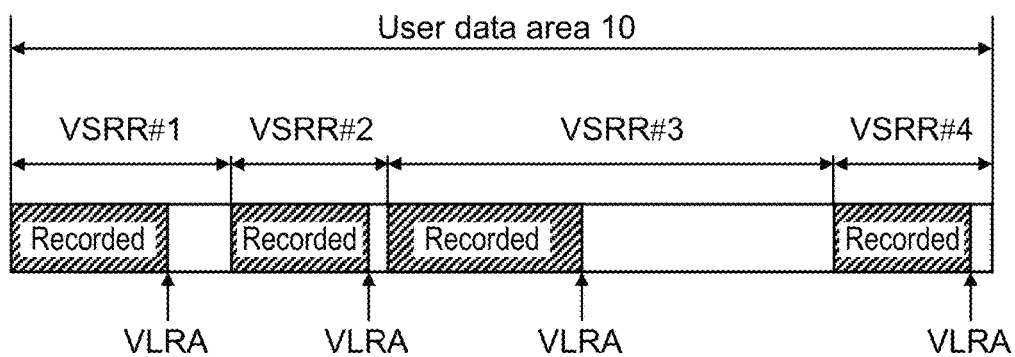
FIG. 16 is a diagram showing an example of four virtual sequential recording ranges VSRR ensured in user data area 10.

FIG. 16 is a diagram showing an example of four virtual sequential recording ranges VSRR ensured in user data area 10. Note that, as shown in FIG. 5 and the like, user data area 10 is a part of data zone 5 of optical disc 1, and is an area given logical sector numbers LSN. In this exemplary embodiment, four VSRR #1 to #4 are ensured in user data area 10. Host device 104 instructs each of four VSRR #1 to #4 to write data thereinto independently.

Each of virtual sequential recording ranges VSRR is constituted of a plurality of clusters. Note that, in one BD-R, approximately 7600 pieces of VSRR can be set at most.

A description is made of an example of information recorded in VSRR #1 to #4. In VSRR #1 and #4, management information of a file system is described. In the management information required for the file system, predetermined management information, which is particularly important, is recorded double in VSRR #1 and #4. Into VSRR #2, metadata such as a file entry is written, and into VSRR #3, a body of a file, which corresponds to a content itself, is written.

As mentioned above, the data is sequentially recorded from a recording starting position in the above-mentioned recording direction and recording order. Such a recording method is referred to as sequential recording. When the sequential recording is performed, the data is written into the sequential areas, and accordingly, it becomes possible to accelerate a recording speed and a reproduction speed.

In accordance with an instruction of host device 104, MPU 630 ensures (or reserves) virtual sequential recording range VSRR before the data writing. MPU 630 generates virtual sequential recording range information (VSRRI) 32 (FIG. 14) in which states of all of VSRR are stored in a predetermined format, and records generated VSRRI 32 in temporary disc management area 21 (FIG. 10). By MPU 630, temporary disc management area 21 is used in order from temporary disc management area #1 of temporary disc management area group 20 (FIG. 9).

In VSRR #1 to #4 of FIG. 16, areas shown as "recorded" indicate that the data is already recorded therein. On an end portion of the already recorded area in each VSRR, a virtual last recorded address (VLRA) is written, which indicates a last recorded position.

In virtual sequential recording range information (VSRRI) 32, such a start sector number (logical sector number LSN) of a block immediately after the virtual last recorded address (VLRA) indicates a virtual next writable address (VNWA) that is a position where the recording of the data can be started. VLRA and VNWA are positions recognized by host device 104 and are updated by MPU 630.

In accordance with a writing instruction into a VNWA position in any VSRR, which is designated from host device 104, MPU 630 converts VNWA concerned into actually written physical sector number PSN_R, and writes the data. Note that, here, the description is made as if MPU 630 performed the writing operation; however, this is for convenience of explanation. It should be noted that, though the description is made as if the writing operation and the reading operation were those of MPU 630, these operations are performed actually in such a manner that ODC 620 that has received an instruction from MPU 630 delivers the recorded or reproduction data with host I/F circuit 640, and controls optical pickup unit 610 to write the data into optical disc 1 or to read the data from optical disc 1. In this specification, the same as above applies to the following.

MPU 630 updates, as real next writable address RNWA, a position (real additional writing position) immediately after a last writing position until which the data has been written in the order shown in FIG. 6. Information indicating real next writable address RNWA is sometimes also referred to as real next writable address information (RNWAI). Real next writable address RNWA is expressed as a PSN_AD address. That is, real next writable address RNWA is managed and updated as physical sector number PSN_R.

Figure 17:
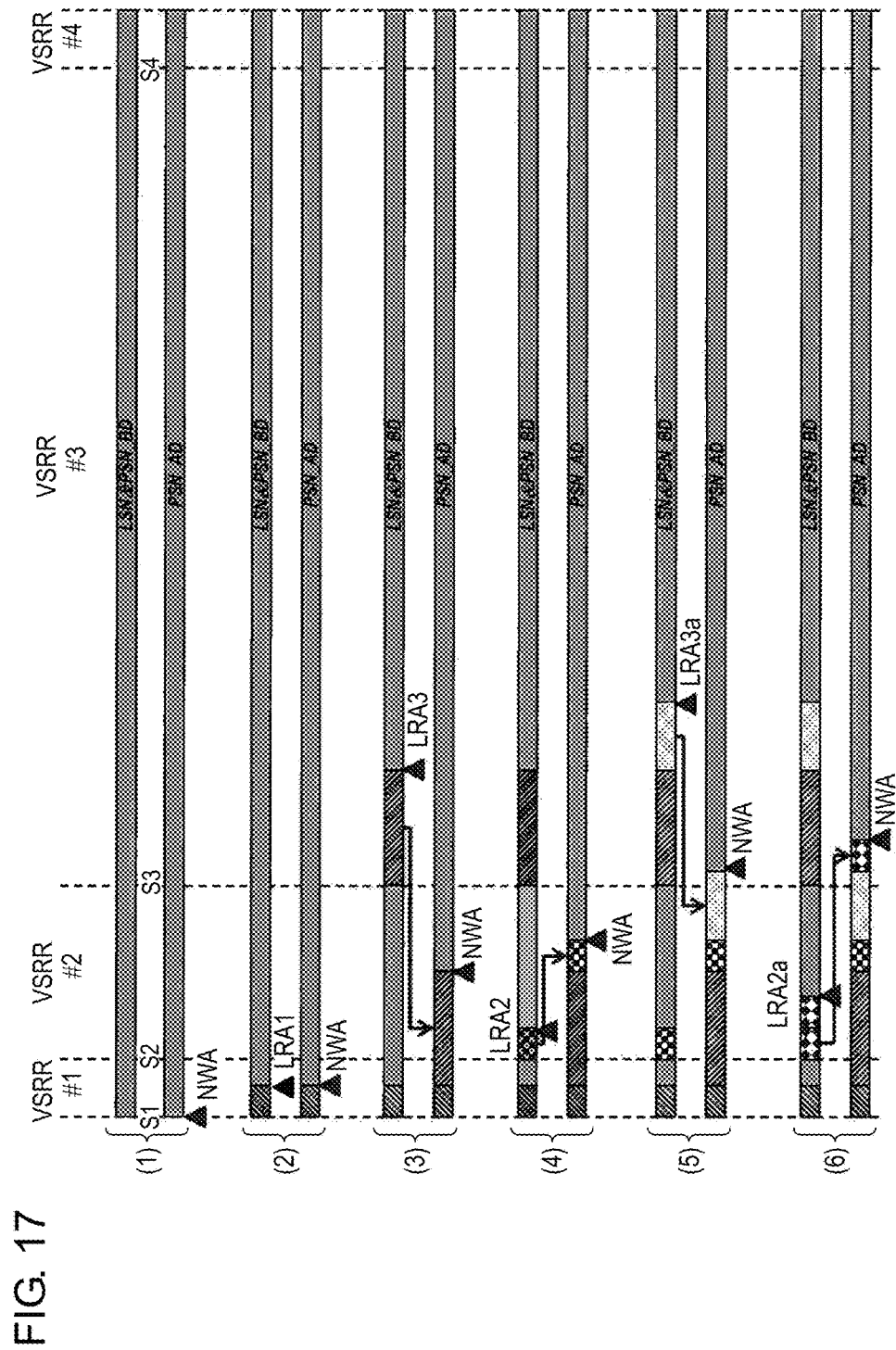
FIG. 17 is a diagram showing transition of a writing state by data writing processing.

FIG. 17 is a diagram showing transition of a writing state by the data writing processing. Each of states (1) to (6) shows a two-stage recording area. An upper stage shows logical sector number LSN designated by host device 104 and physical sector number PSN_D before being converted by MPU 630 by using defect list DFL. As mentioned above, physical sector number PSN_D is the PSN_BD address that directly corresponds to LSN, and accordingly, is shown in integration with logical sector number LSN. A lower stage is physical sector number PSN_R indicating a position into which the data is actually written, physical sector number PSN_R being one after being converted by MPU 630 by using defect list DFL.

FIG. 18 is tables showing, with regard to each of states (1) to (6), transitions of the virtual sequential recording range information (VSRRI) managing virtual last recorded addresses (VLRA) that enables the additional writing of the data, defect list DFL, and real next writable addresses RNWA. A unit of values thus described is block or cluster.

A description is made below of states (1) to (6) while referring to FIG. 17 and FIG. 18 as appropriate. Note that, as shown in FIG. 16, it is assumed that four virtual sequential recording ranges VSRR #1 to #4 are ensured in advance in user data area 10 by MPU 630 before the writing processing is started. Starting positions of the respective areas are S1 to S4.

First, state (1) shows virtual sequential recording ranges VSRR #1 to #4 immediately after MPU 630 ensures the areas. The data is not written yet. Hence, VLRA set for each area indicates a position of 0 (FIG. 18). Moreover, RNWA is set equal to S1.

State (2) shows a result of that MPU 630 writes the data into VSRR #1 in accordance with the instruction of host device 104. By using physical sectors equivalent to the B1 blocks from initial RNWA (PSN_R=S1), MPU 630 writes the data. MPU 630 updates VLRA of VSRR #1 to LRA1 (FIG. 18). VLRA of each of other VSRR #2 to #4 is still 0. Moreover, MPU 630 updates RNWA to S1+B1. Defect list DFL is not updated.

State (3) shows a result of that MPU 630 further writes the data into VSRR #3. A data size is B3+B3a blocks. The sequential area subjected to the description by one entry of DFL mentioned above has a limitation (FIG. 13), and accordingly, the data size is divided into B3 and B3a, and a value of each thereof is set within a range subjected to the description by one entry. By using physical sectors equivalent to the B3+B3a blocks from RNWA (S1+B1) immediately before, MPU 630 writes the data. MPU 630 updates VLRA of VSRR #3 to LRA3 (FIG. 18). VLRA of each of other VSRR #2 and #4 is still 0. MPU 630 updates defect list DFL. Defect list DFL shows that position S3 of VSRR #3 is replaced by actual physical sectors S1+B1 by an amount of a number of blocks B3. Moreover, defect list DFL shows that position S3+B3 of VSRR #3 into which next B3a blocks are written is replaced by actual physical sectors S1+B1+B3 by an amount of number of blocks B3a. Finally, MPU 630 updates RNWA to S1+B1+ΣB3. Note that ΣB3=B3+B3a is established. As understood from (3) of FIG. 17, the data logically written into VSRR #3 is actually written into user data area 10 sequentially from the head of user data area 10.

State (4) shows a result of that MPU 630 further writes the data into VSRR #2 in accordance with the instruction of host device 104. A data size is B2 blocks. By using physical sectors equivalent to the B2 blocks from RNWA (S1+B1+ΣB3) immediately before, MPU 630 writes the data. MPU 630 updates VLRA of VSRR #2 to LRA2 (FIG. 18). MPU 630 updates defect list DFL. Defect list DFL shows that position S2 of VSRR #2 is replaced by actual physical sectors S1+B1+ΣB3 by an amount of a number of blocks B2. Finally, MPU 630 updates RNWA to S1+B1+ΣB3+B2.

State (5) shows a result of that MPU 630 further writes the data into VSRR #3 in accordance with the instruction of host device 104. A data size is B30 blocks. By using physical sectors equivalent to the B30 blocks from RNWA (S1+B1+ΣB3+B2) immediately before, MPU 630 writes the data. MPU 630 updates VLRA of VSRR #3 to LRA3a (FIG. 18). MPU 630 updates defect list DFL. Defect list DFL shows that position S3+ΣB3 of VSRR #3 is replaced by actual physical sectors S1+B1+ΣB3+B2 by an amount of a number of blocks B30. Finally, MPU 630 updates RNWA to S1+B1+ΣB3+B2+B30.

State (6) shows a result of that MPU 630 writes the data into VSRR #2 by logical over write (LOW) in accordance with the instruction of host device 104. The logical over write is a recording method for use in only a write-once recording medium. In an event of updating information in an already written area, in the write-once recording medium, there is a situation where the data cannot be written into already written blocks. Accordingly, the data is written into other area, and after the data is thus written, the data written into the other area is referred to at a time of receiving an access to the original block concerned. In such a way, it becomes possible to handle the write-once recording medium as if the write-once recording medium were a rewritable recording medium.

In state (6), MPU 630 updates the already written data of SRR #2 by the logical over write. By using physical sectors equivalent to the B2 blocks from RNWA (S1+B1+ΣB3+B2+B30) immediately before, MPU 630 writes the data. MPU 630 updates VLRA of VSRR #2 to LRA2a (FIG. 18). MPU 630 updates defect list DFL. Defect list DFL shows that position S2 of VSRR #2 is replaced by actual physical sectors S1+B1+ΣB3+B2+B30 by an amount of a number of blocks B2. That is, when an access is made to position S2 of VSRR #2, newly additionally written data is referred to. In such a way, the logical over write is realized. Finally, MPU 630 updates RNWA to S1+B1+ΣB3+B2+B30+B2.

When the lower stages of states (1) to (6) shown in FIG. 17 are traced, it is understood that the data is sequentially written from the head. Then, as shown in FIG. 18, VSRRI, DFL and RNWA, which are the management information, are updated simultaneously when the recording as described above is performed, whereby it becomes possible to read the data correctly.

Note that, in accordance with the above-mentioned recording method, defect list DFL is updated sequentially, and accordingly, there occurs an apprehension that the data size of defect list DFL may be increased to exceed a size of defect list DFL, which is scheduled in optical disc 1, for example. However, as described with reference to FIG. 13, a contrivance is made, which enables the replacement of the sequential areas by one entry of defect list DFL, whereby the increase of the data size of defect list DFL can be reduced. If there is still an apprehension that the size of defect list DFL may fall short, then in an optical disc that is based on a new standard adopting the above-mentioned recording method, the size of defect list DFL is ensured sufficiently, and in such a way, such a problem does not occur.

Figure 19:
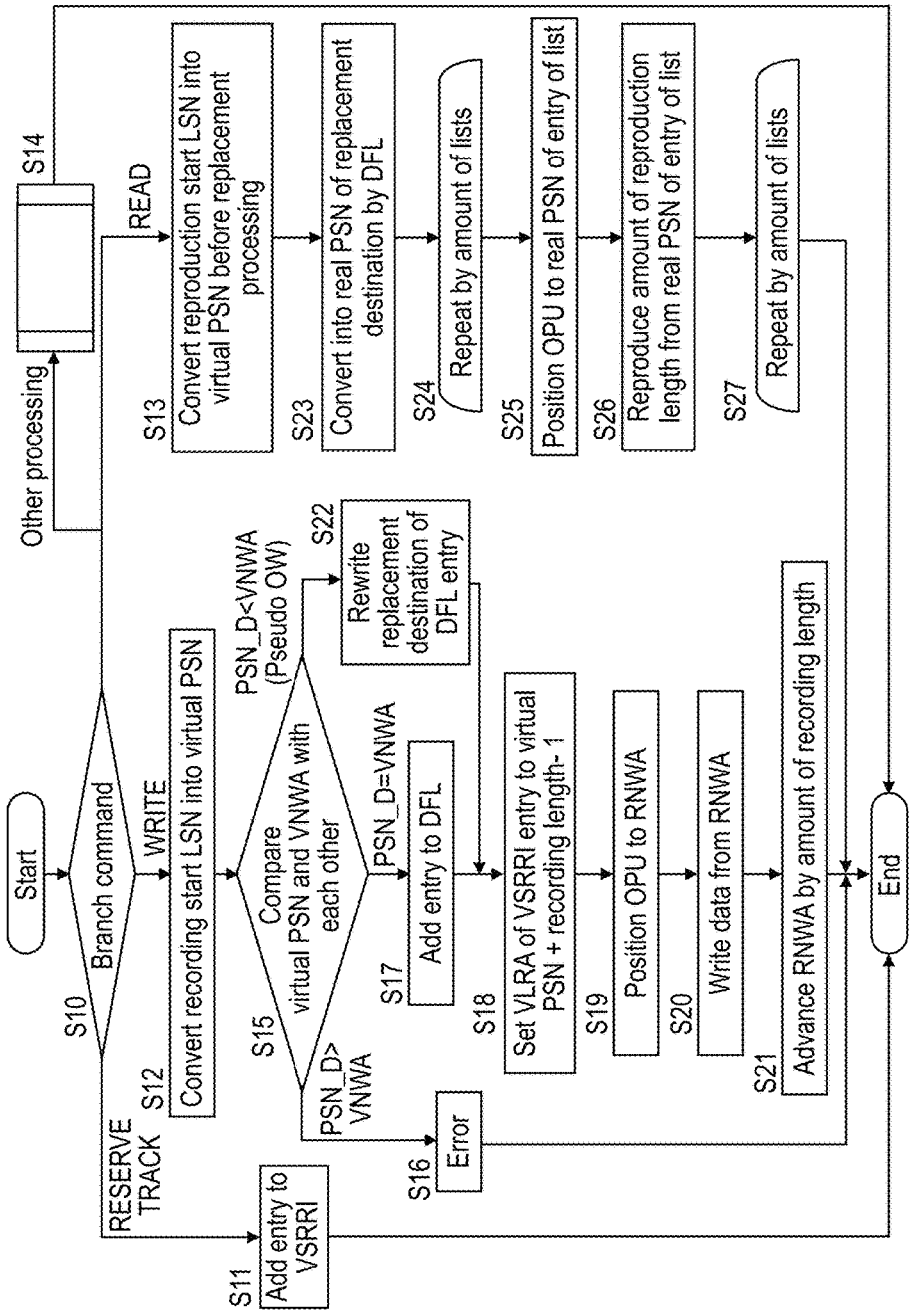
FIG. 19 is a flowchart showing an operation procedure of optical disc device 100.

FIG. 19 is a flowchart showing an operation procedure of optical disc device 100. Operations mentioned below are mainly operations of MPU 630. First, when an instruction (command) is issued from host device 104, MPU 630 receives that command, and performs operations corresponding to the command.

In Step S10, MPU 630 switches processing in response to the command. In a case where the command is a command (RESERVE TRACK command) to ensure VSSR #1 to #4, the processing proceeds to Step S11. If the command is a data writing instruction (WRITE command), then the processing proceeds to Step S12. If the command is a data reading instruction (READ command), then the processing proceeds to Step S13. If the command is a command other than the above, then the processing proceeds to Step S14. Various types of such processing applying to Step S14 can be present; however, details thereof do not particularly relate to the present disclosure, and accordingly, a description of the details is omitted.

In Step S11, MPU 630 adds an entry, which corresponds to a logical track with a designated size, to VSRRI. In such a way, VSRR #1 to #4 are ensured.

Steps S12 and S15 to S22 are the data writing processing (including logical over write processing). Meanwhile, Steps S13 and S23 to S27 are the data reading processing.

First, a description is made below of the data writing processing.

In Step S12, MPU 630 converts logical sector number LSN, for which the writing of the data is started, into virtual PSN (physical sector number PSN_D) before the replacement processing.

In Step S15, MPU 630 searches for a logical track that has a virtual next writable address VNWA coinciding with virtual PSN concerned. In a case of PSN_D>VNWA, the processing proceeds to Step S16, and the processing is ended while making a determination of error. In a case of PSN_D=VNWA, the processing proceeds to Step S17. In a case of PSN_D<VNWA, the processing proceeds to Step S22 while making a determination to perform the logical over write.

In Step S17, MPU 630 adds, to defect list DFL, an entry to replace virtual PSN (PSN_D) by real next writable address RNWA (PSN_R) by an amount of a recording length.

In Step S18, MPU 630 sets a virtual last recorded address (VLRA) of a VSRRI entry, which corresponds to the logical track, to virtual PSN+recording length−1.

In Step S19, MPU 630 performs focus/tracking control by using ODC 620, and positions optical pickup unit 610 at real next writable address RNWA.

In Step S20, by using optical disc controller 620, MPU 630 writes data for an amount of the recording length from real next writable address RNWA.

In Step S21, MPU 630 advances real next writable address RNWA by the amount of the recording length.

In Step S22, MPU 630 rewrites a replacement destination (PSN_D) of the DFL entry, in which virtual PSN indicates a replacement source (PSN_D), to real next writable address RNWA.

Next, a description is made of the data reading processing.

In Step S13, MPU 630 converts logical sector number LSN, which is designated as a reading start position, into virtual PSN (physical sector number PSN_D) before the replacement processing.

Next, a description is made of the data reading processing.

In Step S23, by using defect list DFL, MPU 630 converts virtual PSN (PSN_D) of the replacement source into real physical sector number (PSN_R) of the replacement destination. Even if areas are sequential in virtual PSN (physical sector number PSN_D), the areas are not always sequential in real physical sector number (PSN_R). MPU 630 sometimes generates a list corresponding to a plurality of non-sequential areas.

For example, the list mentioned here is information in which start PSN and a sequential length are combined with each other, that is, can be generated from one entry of defect list DFL (FIG. 12).

Subsequently, MPU 630 repeats the processing of Steps S25 and S26, which are interposed between Steps S24 and S27, by an amount of the list.

In Step S25, by using optical disc controller 620, MPU 630 performs the focus/tracking control, and positions optical pickup unit 610 at real physical sector number PSN_R of the entry of defect list DFL.

In Step S26, by using optical disc controller 620, MPU 630 reads data for an amount of reproduction length from real physical sector number PSN_R of the entry of defect list DFL.

By the processing described above, optical disc device 100 can write and read the data.

Second Exemplary Embodiment

Figure 20:
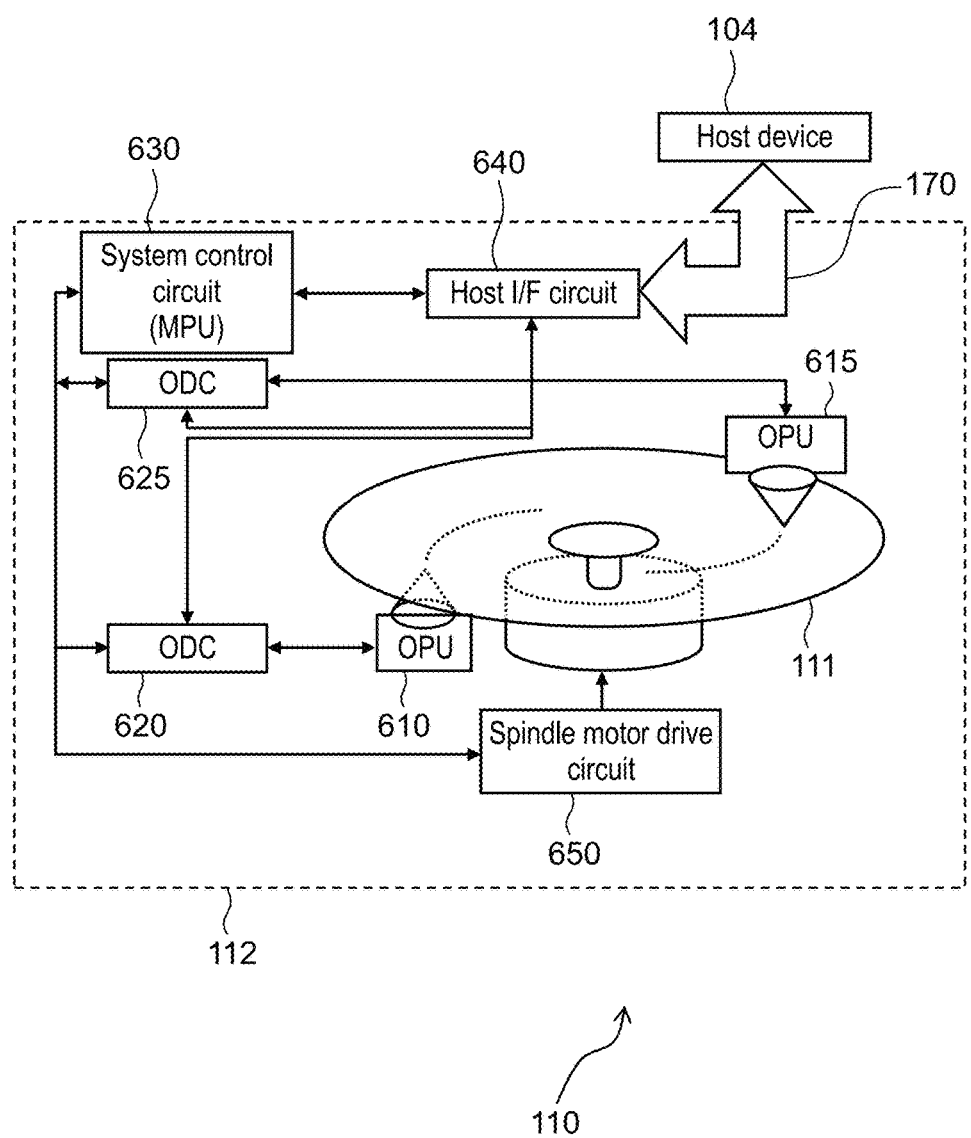
FIG. 20 is a diagram showing optical disc 111 and optical disc device 110 according to a second exemplary embodiment.

FIG. 20 is a diagram showing optical disc 111 and optical disc device 110 according to this exemplary embodiment.

Optical disc device 100 according to the first exemplary embodiment handles optical disc 1 in which three recording layers are provided on one surface, writes data into optical disc 1 as described above, and reads data from optical disc 1.

In accordance with an instruction from host device 104, optical disc drive 112 of optical disc device 110 according to this exemplary embodiment writes data into optical disc 111 in which three recording layers are provided on each of two surfaces (hereinafter, described as a "surface A" and a "surface B"), and reads data from optical disc 111 as described above.

First, a configuration of each surface of optical disc 111 is same as a configuration of optical disc 1 shown in the first exemplary embodiment. Optical disc 111 has such a configuration that two optical discs 1 shown in the first exemplary embodiment are prepared and non-recording layer-side surfaces thereof are pasted to each other. A data structure of each surface of optical disc 111 is same as that in the first exemplary embodiment, and accordingly, a description thereof is omitted.

A description is made below of how optical disc device 110 according to this exemplary embodiment writes data into optical disc 111 and how optical disc device 110 reads data from optical disc 111.

Optical disc drive 112 includes two optical pickup units 610 and 615, which are controlled by ODC 620 and ODC 625, respectively. When MPU 630 transmits writing instructions and data to be written to ODC 620 and ODC 625, ODC 620 and ODC 625 control two optical pickup units 610 and 615 to write the data to the surface A and surface B of optical disc 111. Note that it is assumed that two optical pickup units 610 and 615 have a same structure and that ODC 620 and ODC 625 also have a same structure. Note that, for convenience of explanation, an example of providing ODC 620 and ODC 625, which are two; however, this is not essential. One ODC may be provided to control operations of optical pickup units 610 and 615. Same reference numerals are assigned to constituent elements having same structures and functions as those in FIG. 15, and a description thereof is omitted. Note that, in the following description, ODC 620 is described as surface-A ODC 620, and ODC 625 is described as surface-B ODC 625.

Figure 21:
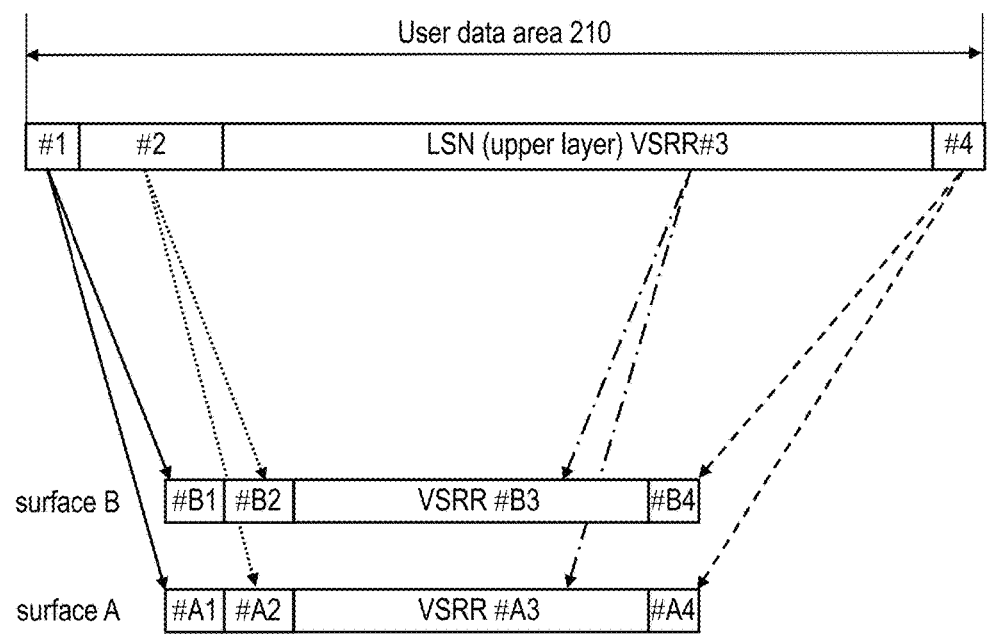
FIG. 21 is a diagram showing a relationship among user data area 210 of optical disc 111, logical four virtual sequential recording ranges VSRR #1 to #4, VSRR #A1 to #A4 provided on a surface A, and VSRR #B1 to #B4 provided on a surface B.

FIG. 21 is a diagram showing a relationship among user data area 210 of optical disc 111, logical four virtual sequential recording ranges VSRR #1 to #4, VSRR #A1 to #A4 provided on the surface A, and VSRR #B1 to #B4 provided on the surface B.

User data area 210 of optical disc 111 is an area ensured in the data zone (for example, refer to FIG. 2) of optical disc 111, and is a user data-writable area that is not restricted to physical recording areas which are the surface A and the surface B. That is, such user data areas 210 of both surfaces of optical disc 111 are treated as one volume.

Host device 104 instructs optical disc drive 112 to ensure logical four virtual sequential recording ranges VSRR #1 to #4 in user data area 210 as described above. Host device 104 is not concerned in that optical disc 111 has the surface A and the surface B. Host device 104 controls how optical disc drive 112 writes data on the surface A and the surface B.

MPU 630 of optical disc drive 112 ensures VSRR #A1 to #A4 and VSRR #B1 to #B4 on the surface A and the surface B, respectively. Upon receiving an instruction to write data into virtual sequential recording range VSRR #n, optical disc drive 112 halves the data, and writes respective pieces of the data into VSRR #An and VSRR #Bn. Four virtual sequential recording ranges VSRR #1 to #4 are replaced by VSRR #An on the surface A with a half size and by VSRR #Bn on the surface B with a half size.

Figure 22:
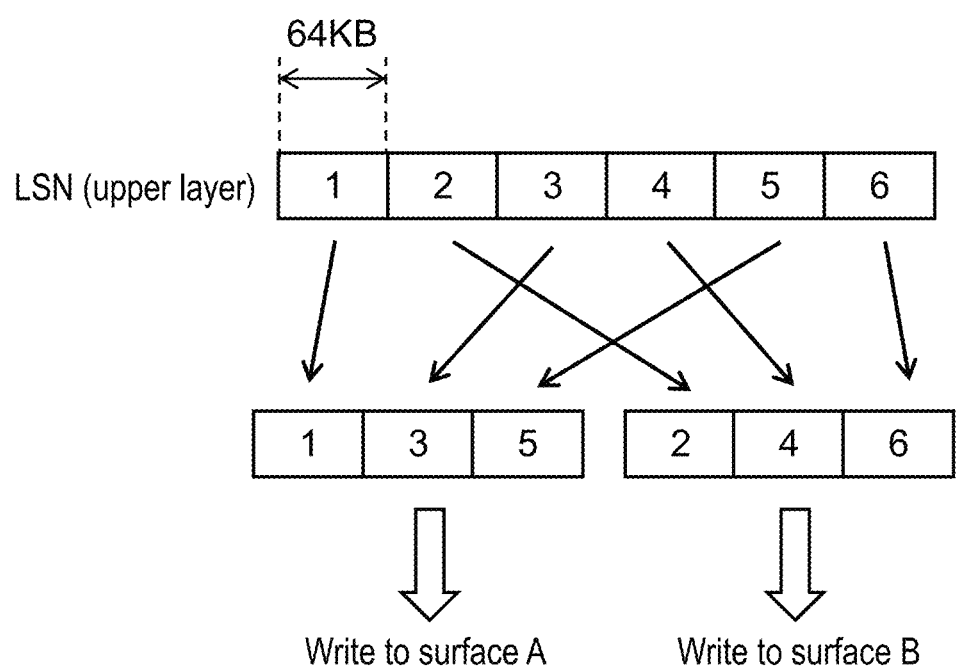
FIG. 22 is a diagram showing a division method of data instructed to be written into certain virtual sequential recording range VSRR #n.

FIG. 22 is a diagram showing a division method of data instructed to be written into certain virtual sequential recording range VSRR #n. It is assumed that the data has a size across six blocks.

MPU 630 divides the six blocks into odd number-th blocks and even number-th blocks, which are then written into the surface A and the surface B, respectively. The writing method as described above is adopted, whereby, at a time of continuously receiving the data from host device 104, optical disc drive 112 can process the data, which is to be written, simultaneously in parallel by distributing the received data to the odd number-th blocks and the even number-th blocks.

Figure 23:
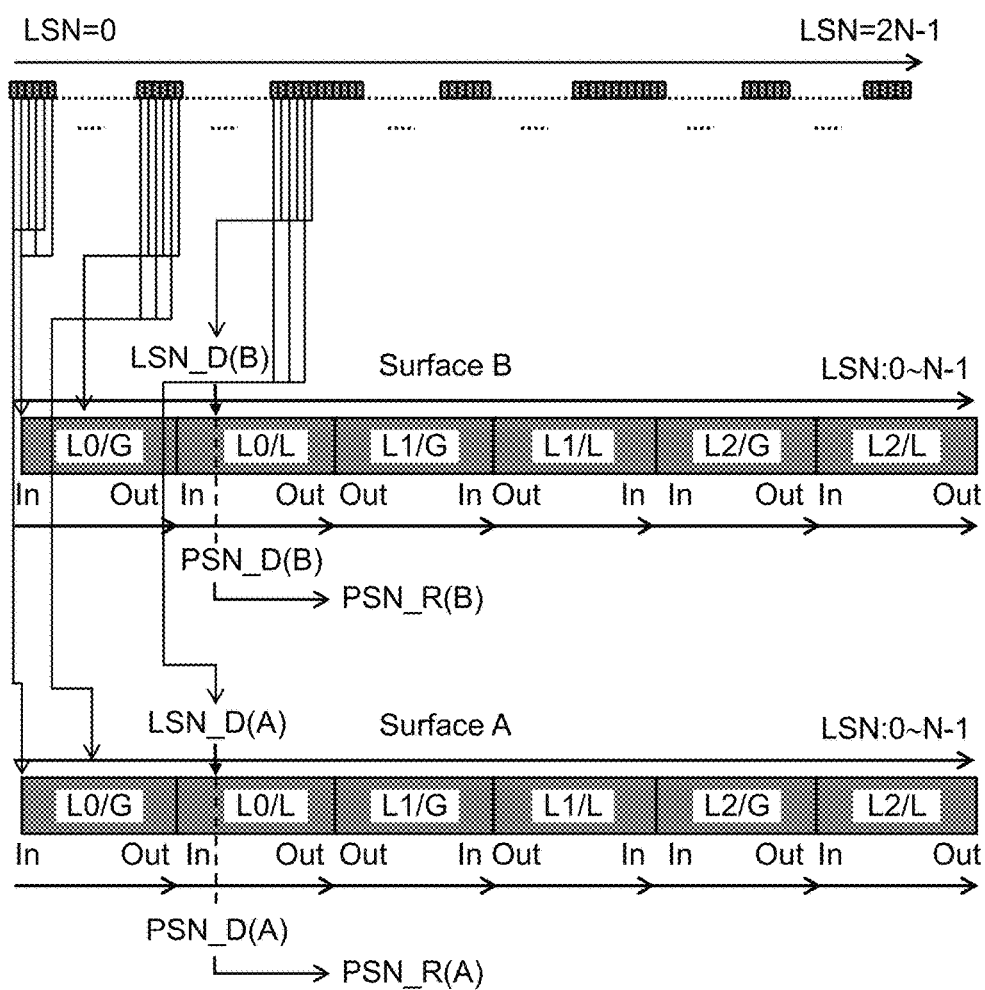
FIG. 23 is a diagram showing a more specific data distribution example to the surface A and the surface B.

FIG. 23 is a diagram showing a more specific data distribution example to the surface A and the surface B. FIG. 23 corresponds to the example of FIG. 8A of the first exemplary embodiment.

It is assumed that the logical sector numbers of the user data area recognized by host device 104 are 0 to 2N−1. As mentioned above, when the respective blocks which compose the data are distributed to the odd number-th blocks and the even number-th blocks, the logical sector numbers and the blocks can be associated with each other as follows in terms of a relationship therebetween. Note that "X" used in the following description indicates the number of user sectors of recording layers L0 (recording layers L0/G and L0/L) of the surface A and the surface B. The number of user sectors of each recording layer of the surface A and the surface B is equal.

LSN=0 to 31: first cluster (first odd number-th block) of recording layer L0/G of the surface A LSN=32 to 63: first cluster (first even number-th block) of recording layer L0/G of the surface B LSN=X−64 to X−33: last cluster (last odd number-th block) of recording layer L0/L of the surface A LSN=X−32 to X−1: last cluster (last even number-th block) of recording layer L0/L of the surface B Also with regard to recording layers L1 and L2 on the surface A and the surface B, a correspondence relationship similar to the above-mentioned correspondence relationship is established.

From host device 104, MPU 630 receives the data and logical sector number LSN that should be subjected to the writing, and specifies logical sector number LSN_D(A) of the surface A and logical sector number LSN_D(B) of the surface B, which are specified from the logical sector number. Then, for each of the surface A and the surface B, the processing described in the first exemplary embodiment is performed separately and independently.

A description is made below of the processing on the surface A; however, the same also applies to the processing on the surface B.

On the surface A, the logical sector numbers and the physical sector numbers are associated with each other in a one-to-one relationship. Hence, when logical sector number LSN_D(A) on the surface A is specified, physical sector number PSN_D(A) corresponding to the logical sector number can also be specified.

MPU 630 converts the physical sector number "PSN_D (A)" into "PSN_R(A)" and writes "PSN_R(A)" into the user data area of the surface A. Physical sector number PSN_R (A) after the conversion is a position immediately after such a position until which the data has been written in the surface A. In such a way, optical disc drive 112 can additionally write the data into the surface A of optical disc 111 in the order shown in FIG. 6 in a sequentially manner. Note that, for simplification of the description, FIG. 23 does not include a diagram showing a PSN_AD address corresponding to the lower stage of FIG. 8A.

MPU 630 of optical disc drive 112 generates defect list DFL in which physical sector numbers "PSN_D" and "PSN_R" are associated with each other, and information indicating the number of blocks into which physical sector numbers "PSN_D" and "PSN_R" are written, and writes defect list DFL into temporary disc management area (TDMA) of the inner zone of the surface A. This processing is the same as that described in the first exemplary embodiment while referring to FIG. 9 and FIG. 10.

Figure 24:
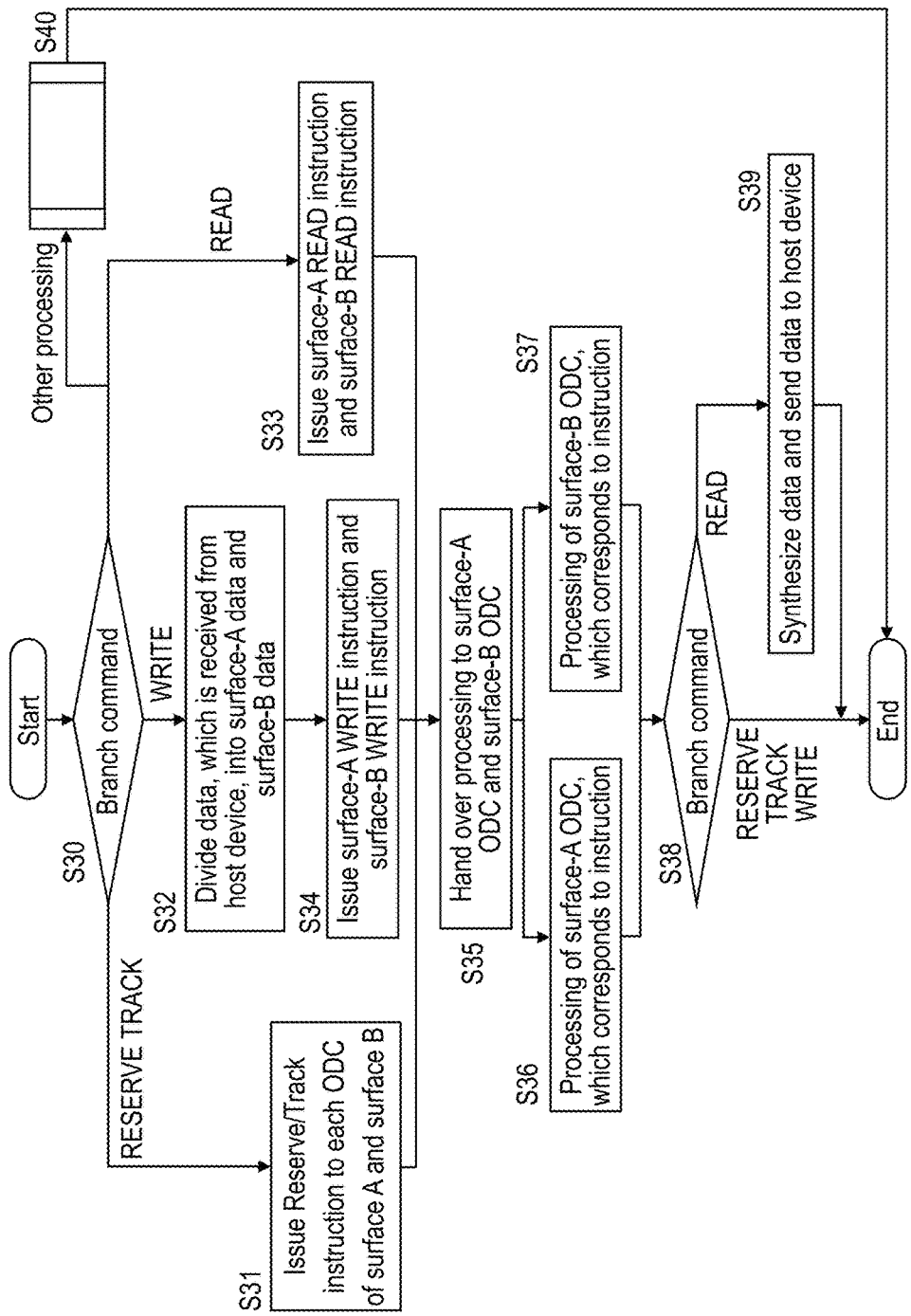
FIG. 24 is a flowchart showing a processing procedure of optical disc drive 112.

FIG. 24 is a flowchart showing a processing procedure of optical disc drive 112.

In Step S30, MPU 630 switches the processing in response to the command. In a case where the command is a command (RESERVE TRACK command) to ensure VSSR, the processing proceeds to Step S31. If the command is a data writing instruction (WRITE command), then the processing proceeds to Step S32. If the command is a data reading instruction (READ command), then the processing proceeds to Step S33. If the command is a command other than the above, then the processing proceeds to Step S40. In a similar way to Step S14 (FIG. 19), various types of such processing applying to Step S40 can be present; however, details thereof do not particularly relate to the present disclosure, and accordingly, a description of the details is omitted.

In Step S31, by using information of the size of the area that is designated and should be ensured, the information being received together with the RESERVE/TRACK command, MPU 630 designates a size obtained by halving the size, and issues the RESERVE/TRACK command to surface-A ODC 620 and surface-B ODC 625.

At this time, depending on the size of the designated area, the area cannot sometimes be divided into two areas with a same size. For example, there can occur such a situation where, though the size ensured on the surface A is (R+1) blocks, the size ensured on the surface B is R blocks. In such a case, MPU 630 performs round-up processing, and equalizes the number of blocks of the area ensured on the surface A and the number of blocks of the area ensured on the surface B to each other. That is, MPU 630 ensures the area with the size of not the R blocks but the (R+1) blocks on the surface B.

In Step S32, MPU 630 divides the writing target data, which is received from the host device, into surface-A partial data and surface-B partial data. In the example of this exemplary embodiment, in a case where the writing target data has a size across a plurality of blocks, the surface-A partial data is data stored in the odd-number blocks, and the surface-B partial data is data stored in the even-number blocks. Thereafter, the processing proceeds to Step S34.

In Step S33, in response to the READ command (reading command) from the host device, MPU 630 issues two new commands obtained by interpreting the READ command, that is, issues a surface-A READ command and a surface-B READ command. MPU 630 sends the surface-A READ command to surface-A ODC 620, and sends the surface-B READ command to surface-B ODC 625. Reading start positions at this time are reading start LSN of the respective surfaces which are the surface A and the surface B, and sizes of the read data are data lengths of data portions read from the respective surfaces.

In Step S34, in response to the WRITE command (writing command) from the host device, MPU 630 issues two new commands obtained by interpreting the WRITE command, that is, issues a surface-A WRITE command and a surface-B WRITE command. MPU 630 sends the surface-A writing instruction to surface-A ODC 620, and sends the surface-B writing instruction to surface-B ODC 625. Note that, together with the surface-A WRITE command, MPU 630 also transfers information of the writing start position and the data to be written to surface-A ODC 620 and surface-B ODC 625. Writing start positions are writing start LSN of the respective surfaces which are the surface A and the surface B, and sizes of the written data are data lengths of data portions written into the respective surfaces.

When Steps S31 to S34 are ended, then in Step S35, MPU 630 instructs surface-A ODC 620 and surface-B ODC 625 on the operations corresponding to the instructions, and thereby hands over the processing to each ODC.

In Step S36, surface-A ODC 620 executes processing corresponding to the instruction, and in Step S37, surface-B ODC 625 executes processing corresponding to the instruction. For example, in a case of the RESERVE/TRACK command, surface-A ODC 620 and surface-B ODC 625 control OPU 610 and OPU 615, respectively, and add entries, which correspond to logical tracks of the designated size, to respective VSRRI of the surface A and the surface B. In a case of the WRITE command, surface-A ODC 620 and surface-B ODC 625 control OPU 610 and OPU 615, respectively, and individually write the data with the designated sizes from ends of the respective positions designated for the surface A and the surface B, that is, last positions subjected to the writing until then.

As mentioned above, in this exemplary embodiment, surface-A ODC 620 writes odd-number block portions of the data, which is sent from the host device, into the surface A, and surface-B ODC 625 writes even-number block portions of the data, which is sent from the host device, into the surface B. In a case of the READ command, surface-A ODC 620 and surface-B ODC 625 control OPU 610 and OPU 615, respectively, and individually read the data with the designated sizes from the respective designated positions for the surface A and the surface B. Note that more specific processing performed for each of the surface A and the surface B corresponds to that the processing from Step S11 to S27 in FIG. 19 is performed for each of the surface A and the surface B. The processing from Step S11 to S27 is already described in the first exemplary embodiment, and accordingly, a description thereof is omitted here.

In Step S38 that follows, MPU 630 switches the processing in response to the command. In a case where the command is the RESERVE/TRACK command and the WRITE command, the processing is ended. Meanwhile, in a case where the command is the READ command, the processing proceeds to Step S39.

In Step S39, MPU 630 synthesizes the data, which are individually read by surface-A ODC 620 and surface-B ODC 625, with each other. As mentioned above, odd-number block portions of certain data are written into the surface A, and even-number block portions of the data are written into the surface B. When the respective block portions are read, MPU 630 alternately arrays orders of the odd-number block portions and the even-number block portions, and restores the data given from the host device before the writing. As a result, MPU 630 can transmit the data to the host device. A more specific description will be made later of synthesis processing of the data while referring to FIG. 27. MPU 630 sends the synthesized data to host device 104.

Figure 25:
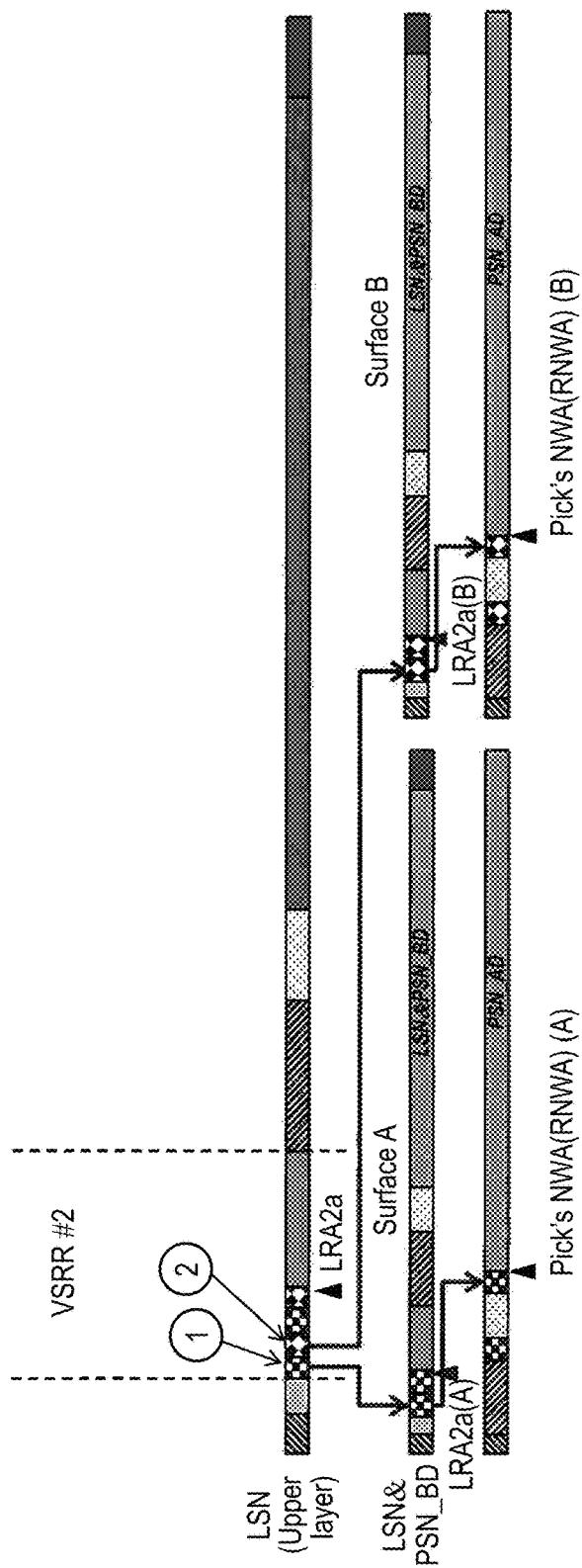
FIG. 25 is a diagram showing transition of a recording state at a time of performing logical overwrite (LOW) processing by an amount of one block on upper layer LSN in a state where blocks 1 and 2 are already subjected to recording.

Next, while referring to FIG. 25, a description is made of the logical over write (LOW) processing of optical disc drive 112 according to this exemplary embodiment.

FIG. 25 is a diagram showing transition of a recording state at a time of performing the LOW processing by an amount of one block on upper layer LSN in a state where blocks 1 and 2 are already subjected to the recording. In an example shown in FIG. 25, it is assumed that the LOW processing is targeted for VSRR #2. Circled numerals are assigned for the sake of convenience to indicate blocks. Note that, in a case where an even number of blocks to be subjected to the LOW processing are present, the processing shown in (6) of FIG. 17 just needs to be performed for each of the surface A and the surface B.

From host device 104, MPU 630 receives an instruction to perform the LOW processing. MPU 630 specifies whether the data to be subjected to the LOW processing is data written into any of the surface A and the surface B. As a result, it is assumed here that the data to be subjected to the LOW processing is block 2 belonging to the surface B. MPU 630 interprets that the instruction is a LOW processing instruction for block 2, and in addition, interprets that the instruction is a LOW processing instruction for block 1. That is, MPU 630 converts the LOW processing instruction targeted for block 2 into the LOW processing instruction for blocks 1 and 2, and then processes the converted LOW processing instruction. Note that MPU 630 treats the recorded data of block 1, which is newly added by this interpretation, on the assumption that the recorded data of block 1 is same as data recorded originally in block 1.

A reason for performing such conversion processing of the command is in order to continue the already recorded areas of VSRR #2 with one another. If it is interpreted that the LOW processing is targeted for only block 2, then LRA 2a(A) of the surface A is not changed, and only LRA 2a(B) of the surface B advances, and in upper layer LSN, a block next to block 2 is left unrecorded, and a block next to the next block to block 2 is regarded already recorded.

As the LOW processing for block 1, MPU 630 refers to defect list DFL, and specifies an entry that has, as a replacement source (PSN_D), virtual PSN indicating block 1, virtual PSN being shown by the PSN_BD address.

Next, MPU 630 reads the data of block 1 based on a replacement destination (PSN_R) of the specified entry and a physical sector number indicated by the PSN_AD address.

In addition, MPU 630 rewrites the replacement destination (PSN_R) of the entry, which is specified a while ago, to real next writable address RNWA (A) at that point of time.

Then, by using one block from real next writable address RNWA (A) at that point of time, MPU 630 writes same data as the data of block 1, which is read a while ago, and updates real next writable address RNWA (A).

Moreover, MPU 630 performs following processing as the LOW processing for block 2. First, MPU 630 refers to defect list DFL, and specifies an entry that has, as a replacement source (PSN_D), virtual PSN indicating block 2, virtual PSN being shown by the PSN_BD address.

In addition, MPU 630 rewrites the replacement destination (PSN_R) of the entry, which is specified a while ago, to real next writable address RNWA (B) at that point of time.

Then, by using one block from real next writable address RNWA at that point of time, MPU 630 writes data after the change of block 2, and updates real next writable address RNWA (B).

By the above-mentioned processing, such a relationship in which recording end address LRA 2a shown in upper layer LSN is distributed from host device 104 simply to recording end address LRA 2a(A) of the surface A and recording end address LRA 2a(B) of the surface B is maintained, and continuity of the recorded area of VSRR #2 in a space of upper layer LSN is also maintained. When the reading instruction for block 1 or block 2 is issued from the host device, the data in the surface A or the surface B, which is subjected to the LOW processing, just needs to be read. Note that, in a case where the LOW processing is performed across an odd number of blocks in upper layer LSN, the odd number being three or more, then even number-th blocks therein just need to be subjected to the same processing between the surface A and the surface B as in the example of (3) in FIG. 18. A last one block just needs to be processed while adding one block thereto so that the one block can be subjected to LOW by the same data as mentioned above.

Figure 26:
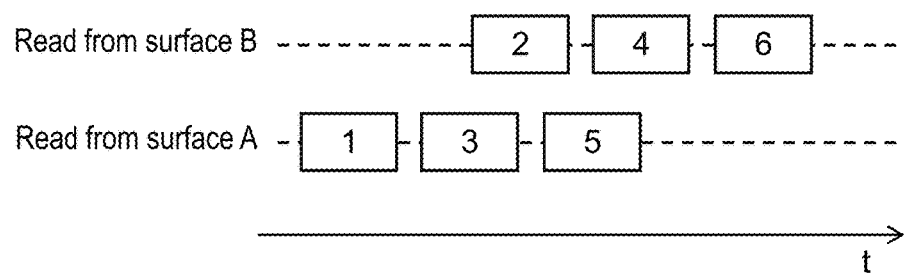
FIG. 26 is a diagram schematically showing reading timing of data from the surface A and reading timing of data from the surface B.
Figure 27:
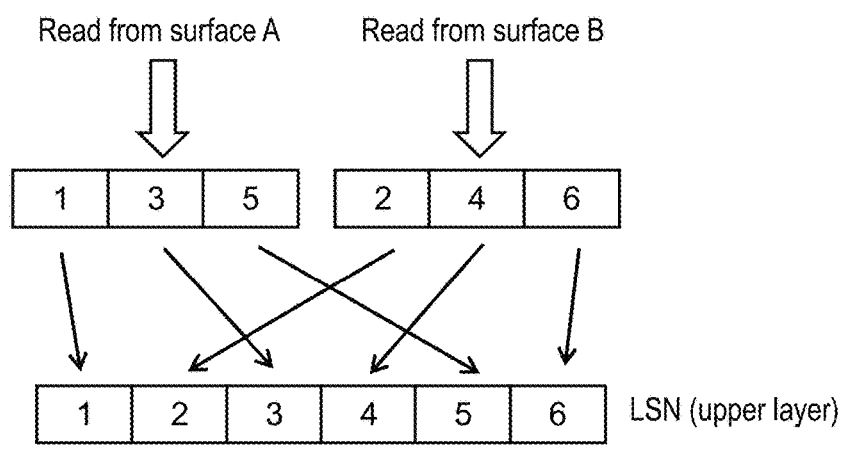
FIG. 27 is a diagram schematically showing processing for sorting the data of read blocks.

Next, while referring to FIG. 26 and FIG. 27, a description is made of the data reading processing by optical disc drive 112 according to this exemplary embodiment. The data reading processing is performed by optical disc device 110 that has received a data reading instruction from host device 104.

As shown in FIG. 20, optical disc drive 112 has two optical pickup units 610 and 615, and accordingly, the data are read from the surface A and the surface B individually and independently. Now, it is assumed that odd number-th blocks in blocks 1 to 6 shown in FIG. 22 are written into the surface A, and that even number-th blocks therein are written into the surface B.

FIG. 26 is a diagram schematically showing reading timing of the data from the surface A and reading timing of the data from the surface B. As understood from FIG. 26, reading results of the surface A and the surface B are independent of each other. For example, the read data of the respective blocks are sequentially stored in buffer memories (not shown) of optical disc drive 112.

FIG. 27 is a diagram schematically showing processing for sorting the data of the read blocks. The data of the respective blocks are read from the surface A and the surface B independently of one another, and are stored in the respective buffer memories (not shown) of surface-A ODC 620 and surface-B ODC 625. It is necessary for MPU 630 to send the data to host device 104 in the order from block 1 to block 6. Therefore, to transmit the data to host device 104, processing for sorting the data of the blocks is necessary.

MPU 630 sorts the data in the order from block 1 to block 6. By this sorting, MPU 630 can transmit the data of the blocks to host device 104 in the order of block 1 to block 6.

Note that it is not essential to actually sort the data on the buffer memories, and an order of transferring the data from surface-A ODC 620 and surface-B ODC 625 to host I/F circuit 640 may be adjusted. That is, MPU 630 may transfer the respective data of block 1 to block 6 sequentially from the buffer memories of surface-A ODC 620 to surface-B ODC 625 to host I/F circuit 640, and may transmit the respective data to host device 104.

The above-mentioned processing is an example of reading processing using optical disc drive 112 (FIG. 20) including two optical pickup units 610 and 615. However, it is also possible to read the data from optical disc 111 having the surface A and the surface B by using optical disc drive 102 (FIG. 15) including one optical pickup unit 610.

For example, a case of reading all data of optical disc 111 is considered. MPU 630 of optical disc drive 102 (FIG. 15) allows ODC 620 to control optical pickup unit 610, and reads all data of the surface A. A reading order is same as the writing order shown in FIG. 6. MPU 630 stores all the read data of the surface A in a storage device such as a hard disk drive (not shown), which has a storage capacity exceeding a storage capacity of optical disc 111.

Thereafter, a user takes out and reverses optical disc 111, and loads optical disc 111 into optical disc drive 102 one more time. MPU 630 allows ODC 620 to control optical pickup unit 610, and reads all data of the surface B. A reading order is same as the writing order shown in FIG. 6. MPU 630 stores all the read data of the surface B, for example, in the storage device in which all the data of the surface A are stored. Thereafter, MPU 630 performs the processing shown in FIG. 27, sorts all the data of the surface A and all the data of the surface B, and restores the original data.

The above-mentioned processing can also be applied to processing other than the processing for reading all the data of the surface A and the surface B. For example, the above-mentioned processing is also applicable as data reading processing in a case where a certain data file is written across portions of the surface A and the surface B. Only a difference from the above is that the data to be read is changed from all the data of the surface A, which are mentioned above, to the surface-A partial data A written into the surface A, and is changed from all the data of the surface B, which are mentioned above, to the surface-B partial data B written into the surface B.

If the above-mentioned processing is performed, then the data simultaneously written into the surface A and the surface B in a divided manner by using the two optical pickup units can be correctly read by using the optical disc drive including only one optical pickup unit.

Note that, in an event where the partial data of the respective surfaces are read, it is not necessary that these data be stored in a same storage device (for example, a hard disk drive). The read data may be stored in separate storage devices. The storage device is not limited to the above-mentioned hard disk drive, and may be a semiconductor storage device as well, or may be an optical recording medium as well.

Moreover, the surface-A partial data A and the surface-B partial data B, which are thus read, may be directly transmitted by using a communication line, and the above-mentioned processing of FIG. 27 may be performed in an instrument that has received these data, whereby the data may be restored.

In accordance with the optical disc device according to the present disclosure, the data can be stably written into the optical disc in which two tracks constituted of the adjacent land and groove are formed in a spiral shape. A seek operation of the optical pickup unit is reduced, whereby a high-speed writing operation can be realized. In addition, the data can be read from the optical disc as described above.

What is claimed is:

1. A writing method of data into a write-once optical disc having a plurality of recording layers on at least one surface of the write-once optical disc, the writing method being performed by an optical disc drive including at least one optical pickup unit (OPU), wherein
in each of the plurality of recording layers, two tracks into which data is written, the two tracks being constituted of adjacent land and groove, are formed in a spiral shape, and a user data area where user data is recordable is set, and
the writing method comprises:
(x) a step of receiving data and a writing instruction of the data, from a host device;
(a) a step of recording management information,
the management information including:
virtual sequential recording range information (VS-RRI) that manages, as a virtual physical sector number (PSN_D), a last recorded address (VLRA) of data in each of a plurality of virtual sequential recording ranges (VSRR) ensured in advance;

defect list (DFL) that shows a replacement correspondence relationship between the virtual physical sector number (PSN_D) and an actually recorded physical sector number (PSN_R); and real next writable address information (RNWAI) indicating a real next writable address (RNWA) actually subjected to additional writing subsequently to the physical sector number (PSN_R);

(b) a step of converting a logical sector number (LSN), which indicates a writing position of the received data, into the virtual physical sector number (PSN_D);

(c) a step of writing the data into the real next writable address (RNWA) of each user data area of the plurality of recording layers in response to the writing instruction, the step (c) including:
 (c0) a step of designating, as an operation layer, a first recording layer among the plurality of recording layers;
 (c1) a step of sequentially writing data along a first track of the user data area in the operation layer;
 (c2) a step of sequentially writing data along a second track of the user data area after the recording to the first track of the user data area is completed; and
 (c3) a step of newly designating, as an operation layer, a recording layer present at a position closer than the operation layer when viewed from a laser-light incident side, and writing data by the step (c1) and the step (c2); and (d) a step of updating the defect list (DFL) and adding information of a replacement correspondence relationship between the virtual physical sector number (PSN_D) of the designated data and the actually recorded physical sector number (PSN_R) that is the real next writable address (RNWA) at a point of time when the data is written.

2. The writing method of data according to claim 1, wherein the step (b) includes
 (b1) a step of comparing the logical sector number (LSN) which indicates the writing position of the data, with a logical sector number (VNWA) of a head position of a block immediately after a position indicated by the last recorded address (VLRA) of the data in the virtual sequential recording range information (VSRRI), and when the logical sector number (LSN) which indicates the writing position of the data, coincides with the logical sector number (VNWA) of the head position, then in the step (c), the data is sequentially written from the real next writable address (RNWA), and in the step (d), with regard to the data, information of a replacement correspondence relationship between the virtual physical sector number (PSN_D) taken as a replacement source and the real next writable address (RNWA) at a point of time when the data is written, the real next writable address (RNWA) being taken as a replacement destination, is newly added to the defect list (DFL).

3. The writing method of data according to claim 1, wherein the step (b) includes
 (b1) a step of comparing the logical sector number (LSN) which indicates the writing position of the data, with a logical sector number (VNWA) of a head position of a block immediately after a position indicated by the last recorded address (VLRA) of the data in the virtual sequential recording range information (VSRRI), and when the logical sector number (LSN) which indicates the writing position of the data, is smaller than the logical sector number (VNWA) of the head position, then in order to perform logical over write processing, in the step (c), the data is additionally written from the real next writable address (RNWA), and in the step (d), with regard to the data, the information of the replacement correspondence relationship, which includes the virtual physical sector number (PSN_D) as the replacement source, is searched for from the defect list (DFL), and a physical sector number (PSN_R) that is a replacement destination of the information of the correspondence relationship is replaced by the real next writable address (RNWA) at a point of time when the data is written, and the real next writable address (RNWA) is registered in the defect list (DFL).

4. The writing method of data according to claim 1, further comprising:
 (y) a step of receiving an instruction to ensure the plurality of virtual sequential recording ranges (VSRR) from the host device, the step (y) being provided before the step (x), wherein
in the step (a), there is recorded the virtual sequential recording range information (VSRRI) including information of a number of the plurality of virtual sequential recording ranges (VSRR), information of existing positions of the plurality of virtual sequential recording ranges (VSRR), and information of a last recorded address of the data.

5. The writing method of data according to claim 1, wherein when the write-once optical disc includes a plurality of recording layers on each of a surface A as one surface and a surface B as the other surface, and the optical disc drive includes two optical pickup units (OPU) which individually perform writing of data for the surface A and the surface B of the write-once optical disc, the step (x) further includes, in response to the data and the writing instruction of the data, which are sent from the host device:
 (x1) a step of dividing the data into partial data A to be written into the surface A and partial data B to be written into the surface B; and
 (x2) a step of issuing an instruction to write the partial data A into the surface A and issuing an instruction to write the partial data B into the surface B.

6. The writing method of data according to claim 5, further comprising:
 (y) a step of receiving an instruction to ensure the plurality of virtual sequential recording ranges (VSRR) from the host device, the step (y) being provided before the step (x), wherein the step (y) includes:
 (y1) a step of receiving, from the host device, an instruction to ensure the virtual sequential recording ranges (VSRR) and a designation of a size of an area to be ensured, and making an adjustment so that the virtual sequential recording ranges (VSRR) are equally divided into virtual sequential recording ranges (VSRR) to be individually ensured for the surface A and the surface B, and (y2) a step of issuing an area ensuring instruction for the surface A for ensuring the virtual sequential recording ranges (VSRR) on the surface A and an area ensuring instruction for the surface B for ensuring the virtual sequential recording ranges (VSRR) on the surface B, wherein in the step (a), recording the virtual sequential recording range information (VSRRI) including pieces of information of the virtual sequential recording ranges (VSRR), the pieces having a same size, on each of the surface A and the surface B, is in accordance with the area ensuring instruction for the surface A and the area ensuring instruction for the surface B.

7. The writing method of data according to claim 5, wherein in the step (x1), when the data has a size across a plurality of blocks, then among the data, an odd-number block portion is divided as partial data A to be written into the surface A, and an even-number block portion is divided as partial data B to be written into the surface B.

8. The writing method of data according to claim 5, wherein in the step (x), the data and an instruction to perform logical over write processing are received from the host device, and even when the logical over write processing includes update of data recorded in one of the surface A and the surface B, then in the step (x2), a writing instruction into the surface A and a writing instruction into the surface B are issued.

9. A reading method of data for reading data from the write-once optical disc into which the data is written by the writing method of data according to claim 7, by using an optical disc drive including two optical pickup units (OPU), the reading method comprising:

(e) a step of receiving a reading instruction of the data, from the host device;

(f) a step of reading the partial data A from the surface A, and reading the partial data B from the surface B; and (g) a step of restoring the data from the partial data A and the partial data B, wherein the partial data A is divided from a head of the partial data A in a size unit of the block and the divided pieces of the partial data A are arrayed as the odd-number block portion of the data, and the partial data B is divided from a head of the partial data B in the size unit of the block and the divided pieces of the partial data B are arrayed as the even-number block portion of the data.

10. A reading method of data for reading data from the write-once optical disc into which the data is written by the writing method of data according to claim 7, by using an optical disc drive including one optical pickup unit (OPU), the reading method comprising:

(h) a step of receiving a reading instruction of the data, from the host device;

(i) a step of reading the partial data A from the surface A when the data is written across the surface A and the surface B;

(j) a step of storing the read partial data A in a first buffer;

(k) a step of reading the partial data B from the surface B;

(l) a step of storing the read partial data B in a second buffer;

(m) a step of restoring the data from the partial data A stored in the first buffer and the partial data B stored in the second buffer, wherein the partial data A is divided from a head of the partial data A in a size unit of the block, and the divided pieces of the partial data A are arrayed as the odd-number block portion of the data, and the partial data B is divided from a head of the partial data B in the size unit of the block, and the divided pieces of the partial data B are arrayed as the even-number block portion of the data.

11. The reading method of data according to claim 10, wherein in the step (j), the partial data A is stored in a first buffer provided in a storage device, and in the step (l), the partial data B is stored in a second buffer provided in the storage device.

12. An optical disc drive that reads data from the write-once optical disc into which the data is written by the writing method of data according to claim 7, the optical disc drive comprising:

two optical pickup units;

at least one optical disc controller that controls operations of the two optical pickup units;

an interface circuit that communicates with a host device; and a system control circuit that controls the communication of the interface circuit with the host device, operates the at least one optical disc controller based on an instruction from the host device, and controls an operation corresponding to the instruction, wherein the system control circuit executes:

(x) an operation of receiving a reading instruction of the data, from the host device through the interface circuit;

(f) an operation of reading the partial data A from the surface A, and reading the partial data B from the surface B; and (g) an operation of restoring the data from the partial data A and the partial data B, wherein the partial data A is divided from a head of the partial data A in a size unit of the block, and the divided pieces of the partial data A are arrayed as the odd-number block portion of the data, and the partial data B is divided from a head of the partial data B in the size unit of the block, and the divided pieces of the partial data B are arrayed as the even-number block portion of the data.

13. An optical disc drive that reads data from the write-once optical disc into which the data is written by the writing method of data according to claim 7, the optical disc drive comprising:

an optical pickup unit;

an optical disc controller that controls operations of the optical pickup unit;

an interface circuit that communicates with a host device;

a system control circuit that controls the communication of the interface circuit with the host device, operates the optical disc controller based on an instruction from the host device, and controls an operation corresponding to the instruction; and a first buffer and a second buffer, wherein the system control circuit executes:

(h) an operation of receiving a reading instruction of the data, from the host device through the interface circuit;

(i) an operation of operating the optical disc controller and reading the partial data A from the surface A when the data is written across the surface A and the surface B;

(j) an operation of storing the read partial data A in the first buffer;
(k) an operation of reading the partial data B from the surface B;
(l) an operation of storing the read partial data B in the second buffer; and
(m) an operation of restoring the data from the partial data A stored in the first buffer and the partial data B stored in the second buffer, wherein the partial data A is divided from a head of the partial data A in a size unit of the block, and the divided pieces of the partial data A are arrayed as the odd-number block portion of the data, and the partial data B is divided from a head of the partial data B in the size unit of the block, and the divided pieces of the partial data B are arrayed as the even-number block portion of the data.

14. The optical disc drive according to claim 13, further comprising:
a storage device including the first buffer and the second buffer.

15. An optical disc drive comprising:
at least one optical pickup unit;
an optical disc controller that controls operations of the optical pickup unit;
an interface circuit that communicates with a host device; and
a system control circuit that controls the communication with the host device, operates the optical disc controller based on an instruction from the host device, and controls an operation corresponding to the instruction,
the optical disc drive being configured to write data into a write-once optical disc having a plurality of recording layers on at least one surface of the write-once optical disc,
wherein
in each of the plurality of recording layers, two tracks into which data is written, the two tracks being constituted of adjacent land and groove, are formed in a spiral shape, and a user data area where user data is recordable is set, and
(x) the system control circuit receives data and a writing instruction of the data from the host device through the interface circuit, and
the system control circuit operates the optical disc controller to execute operations for the write-once optical disc, the operations including:
(a) an operation of recording management information that includes:
virtual sequential recording range information (VSRRI) that manages, as a virtual physical sector number (PSN_D), a last recorded address of data (VLRA) in each of a plurality of virtual sequential recording ranges (VSRR) ensured in advance;
defect list (DFL) that shows a replacement correspondence relationship between the virtual physical sector number (PSN_D) and an actually recorded physical sector number (PSN_R); and
real next writable address information (RNWAI) that indicates a real next writable address (RNWA) actually subjected to additional writing subsequently to the physical sector number (PSN_R);
(b) an operation of converting a logical sector number (LSN) which indicates a writing position of the received data, into the virtual physical sector number (PSN_D);
(c) an operation of writing the data into the real next writable address (RNWA) of each user data area of the plurality of recording layers in response to the writing instruction,
the operation (c) including:
(c0) an operation of designating, as an operation layer, a first recording layer among the plurality of recording layers;
(c1) an operation of sequentially writing data along a first track of the user data area in the operation layer;
(c2) an operation of sequentially writing data along a second track of the user data area after the recording to the first track of the user data area is completed; and
(c3) an operation of newly designating, as an operation layer, a recording layer present at a position closer than the operation layer when viewed from a laser-light incident side, and writing data by the operation (c1) and the operation (c2); and
(d) an operation of updating the defect list (DFL) and adding information of a replacement correspondence relationship between the virtual physical sector number (PSN_D) of the designated data and the actually recorded physical sector number (PSN_R) that is the real next writable address (RNWA) at a point of time when the data is written.

16. The optical disc drive according to claim 15, wherein the system control circuit executes, as the operation (b),
(b1) an operation of comparing the logical sector number (LSN) which indicates the writing position of the data, with a logical sector number (VNWA) of a head position of a block immediately after a position indicated by the last recorded address (VLRA) of the data in the virtual sequential recording range information (VSRRI),
the system control circuit operates the optical disc controller when the logical sector number (LSN) which indicates the writing position of the data, coincides with the logical sector number (VNWA) of the head position,
in the operation (c), the system control circuit sequentially writes the data from the real next writable address (RNWA), and
in the operation (d), with regard to the data, the system control circuit newly adds, to the defect list (DFL), information of a replacement correspondence relationship between the virtual physical sector number (PSN_D) taken as a replacement source and the real next writable address (RNWA) at a point of time when the data is written, the real next writable address (RNWA) being taken as a replacement destination.

17. The optical disc drive according to claim 15, wherein the system control circuit executes, as the operation (b),
(b1) an operation of comparing the logical sector number (LSN) which indicates the writing position of the data, with a logical sector number (VNWA) of a head position of a block immediately after a position indicated by the last recorded address (VLRA) of the data in the virtual sequential recording range information (VSRRI),
the system control circuit operates the optical disc controller in order to perform logical over write processing when the logical sector number (LSN) which indicates the writing position of the data, is smaller than the logical sector number (VNWA) of the head position, in the operation (c), the system control circuit additionally writes the data from the real next writable address (RNWA), and in the operation (d), with regard to the data, the system control circuit searches for the information of the replacement correspondence relationship which includes the virtual physical sector number (PSN_D) as the replacement source, from the defect list (DFL), replaces a physical sector number (PSN_R) that is a replacement destination of the information of the correspondence relationship with the real next writable address (RNWA) at a point of time when the data is written, and registers the real next writable address (RNWA) in the defect list (DFL).

18. The optical disc drive according to claim 15, wherein before the operation (x), the system control circuit executes (y) an operation of receiving an instruction to ensure the plurality of virtual sequential recording ranges (VSRR), from the host device through the interface circuit, and the system control circuit operates the optical disc controller to record, in the operation (a), the virtual sequential recording range information (VSRRI) including information of a number of the plurality of virtual sequential recording ranges (VSRR), information of existing positions of the plurality of virtual sequential recording ranges (VSRR), and information of a last recorded address of the data.

19. The optical disc drive according to claim 15, wherein the write-once optical disc includes a plurality of recording layers on each of a surface A as one surface and a surface B as the other surface, and when the at least one optical pickup unit is two optical pickup units, and the two optical pickup units individually perform data writing for the surface A and surface B of the write-once optical disc, then in the operation (x), the system control circuit further executes, in response to the data and the writing instruction of the data, which are sent from the host device:
   (x1) an operation of dividing the data into partial data A to be written into the surface A and partial data B to be written into the surface B; and
   (x2) an operation of issuing an instruction to write the partial data A into the surface A and an instruction to write the partial data B into the surface B.

20. The optical disc drive according to claim 19, wherein before the operation (x), the system control circuit executes (y) an operation of receiving an instruction to ensure the plurality of virtual sequential recording ranges (VSRR), from the host device through the interface circuit, and in the operation (y), the system control circuit executes:
   (y1) an operation of receiving an instruction to ensure the virtual sequential recording ranges (VSRR) and a designation of a size of an area to be ensured, from the host device, and making an adjustment so that the virtual sequential recording ranges (VSRR) are equally divided into virtual sequential recording ranges (VSRR) to be individually ensured for the surface A and the surface B, and
   (y2) an operation of issuing an area ensuring instruction for the surface A for ensuring the virtual sequential recording ranges (VSRR) on the surface A and an area ensuring instruction for the surface B for ensuring the virtual sequential recording ranges (VSRR) on the surface B, and in the operation (a), an operation of recording the virtual sequential recording range information (VSRRI) including pieces of information of the virtual sequential recording ranges (VSRR), the pieces having a same size, on each of the surface A and the surface B, is in accordance with the area ensuring instruction for the surface A and the area ensuring instruction for the surface B.

21. The optical disc drive according to claim 19, wherein in the operation (x1), when the data has a size across a plurality of blocks, then among the data, the system control circuit divides an odd-number block portion as partial data A to be written into the surface A, and divides an even-number block portion as partial data B to be written into the surface B.

22. The optical disc drive according to claim 19, wherein in the operation (x), the system control circuit receives the data and an instruction to perform logical over write processing, from the host device, and even when the logical over write processing includes update of data recorded in one of the surface A and the surface B, then in the operation (x2), the system control circuit issues a writing instruction into the surface A and a writing instruction into the surface B.

* * * * *